(12) United States Patent
Mallya

(10) Patent No.: US 9,182,963 B2
(45) Date of Patent: Nov. 10, 2015

(54) COMPUTERIZED MIGRATION TOOL AND METHOD

(71) Applicant: Syntel, Inc., Troy, MI (US)

(72) Inventor: Srinath Mallya, Tamil Nadu (IN)

(73) Assignee: Syntel, Inc., Troy, MI (US)

( * ) Notice: Subject to any disclaimer, the term of this patent is extended or adjusted under 35 U.S.C. 154(b) by 8 days.

(21) Appl. No.: 13/915,817

(22) Filed: Jun. 12, 2013

(65) Prior Publication Data

US 2013/0339943 A1 Dec. 19, 2013

Related U.S. Application Data

(60) Provisional application No. 61/661,003, filed on Jun. 18, 2012, provisional application No. 61/764,613, filed on Feb. 14, 2013.

(51) Int. Cl.
*G06F 9/445* (2006.01)
*G06F 17/30* (2006.01)
*G06F 9/44* (2006.01)

(52) U.S. Cl.
CPC .. *G06F 8/60* (2013.01); *G06F 8/76* (2013.01); *G06F 17/303* (2013.01)

(58) Field of Classification Search
CPC .................................................. G06F 17/303
USPC .......................................... 707/809; 717/176
See application file for complete search history.

(56) References Cited

U.S. PATENT DOCUMENTS

| | | | |
|---|---|---|---|
| 7,503,042 B2 | 3/2009 | Henrickson et al. | |
| 7,831,568 B2 | 11/2010 | Sattler et al. | |
| 7,831,636 B2 * | 11/2010 | Wietlisbach et al. | 707/803 |
| 2005/0050076 A1 * | 3/2005 | Tong et al. | 707/100 |
| 2006/0235899 A1 * | 10/2006 | Tucker | 707/200 |
| 2007/0179983 A1 * | 8/2007 | Putman | 707/200 |
| 2008/0281820 A1 * | 11/2008 | Do et al. | 707/6 |
| 2008/0306986 A1 * | 12/2008 | Doyle, Sr. | 707/102 |
| 2010/0287263 A1 | 11/2010 | Liu et al. | |
| 2010/0318609 A1 | 12/2010 | Lahiri et al. | |
| 2012/0174056 A1 * | 7/2012 | Chapman et al. | 717/101 |
| 2013/0212553 A1 * | 8/2013 | Balasubramanian | 717/102 |
| 2014/0019977 A1 * | 1/2014 | Kakade et al. | 718/101 |

FOREIGN PATENT DOCUMENTS

KR 1020070025913 * 3/2007 .............. G06F 17/40

OTHER PUBLICATIONS

"Method and design tool aids for transforming non-cloud specific solution models to cloud specific system models"; IP.com Prior Art Database Technical Disclosure; May 5, 2010.*

(Continued)

*Primary Examiner* — Qing Chen
*Assistant Examiner* — Clint Thatcher
(74) *Attorney, Agent, or Firm* — Dykema Gossett PLLC

(57) ABSTRACT

A computerized system, method, and computer program product for migrating applications are disclosed. A processor is configured to execute the stored instructions. The instructions may cause the processor to perform the steps including: analyzing a legacy application to be migrated to a new platform; generating one or more reports showing results of the analysis of the legacy application; migrating a schema of the legacy application to the new platform; and migrating a content of the legacy application to the new platform.

29 Claims, 24 Drawing Sheets

(56) References Cited

OTHER PUBLICATIONS

Steve Walch; "11 Ways to Migrate Lotus Notes Applications to SharePoint and Office 365"; i.zdnet.com whitepapers website; Nov. 15, 2011.*

Wu et al.; "Legacy Systems Migration—A Method and Its Tool-Kit Framework"; APSEC'97 and ICSC'97 Proceedings; Dec. 2-5, 1997.*

AvePoint, Unleashing the Power of SharePoint, DocAve v5 Lotus Notes Migrator, Automated High Performance Content Migration to SharePoint 2007 (Sep. 8, 2008, 5 pgs.).

Quick Start Guide, Lotus Notes Migrator, Migrate Content Easily from Lotus Notes into SharePoint with the DocAve 5 Platform (Oct. 10, 2008, 5 pgs.).

AvePoint, User Guide, DocAve Lotus Notes Migrator for Microsoft Exchange 1.1, Using the DocAve Notes Migrator for Exchange to Perform a Basic Migration (Mar. 11, 2010, 12 pgs.).

AvePoint, News Releases, AvePoint's DocAve Migrator Enables a Swift Transition from Lotus Notes to SharePoint 2010 (Mar. 17, 2010, 2 pgs.).

Lotus Notes Application to SharePoint Migration Process, Hoang Nhut Nguyen (Jan. 22, 2011, 21 pgs.).

BinaryTree, Vadim Gringolts, A Comprehensive Strategy for Migrating from Lotus Domino to Microsoft Exchange 2010 (Apr. 22, 2010, 59 pgs.).

EnsureZero, Dell 1, Build Rich SharePoint Applications, Eliminating the Need for Expensive Development Resources (May 21, 2015, 2 pgs.).

Code Project for Those Who Code, Migrating Lotus Notes (Domino) Data to Microsoft Office SharePoint Service 2007, Mohamed Faizal (Dec. 11, 2008, 14 pgs.).

MSEchange.org, Migrating from Domino to Exchange 2007 (part 1), Neil Hobson (Aug. 14, 2007, 4 pgs.).

MSEchange.org, Migrating from Domino to Exchange 2007 (part 2), Neil Hobson (Sep. 4, 2007, 7 pgs.).

MSEchange.org, Migrating from Domino to Exchange 2007 (part 3), Neil Hobson (Sep. 20, 2007, 5 pgs.).

MSEchange.org, Migrating from Domino to Exchange 2007 (part 4), Neil Hobson (Oct. 9, 2007, 5 pgs.).

MSEchange.org, Migrating from Domino to Exchange 2007 (part 5), Neil Hobson (Nov. 6, 2007, 5 pgs.).

MSEchange.org, Migrating from Domino to Exchange 2007 (part 6), Neil Hobson (Nov. 22, 2007, 5 pgs.).

IEEE Computer Society, Wu et al. "Legacy Systems Migration—A Method and Its Tool-Kit Framework" (Dec. 1997, 312-320 pgs.).

* cited by examiner

| | pp/discussion.nsf | | | | |
|---|---|---|---|---|---|
| 1 | ACLLEVEL_READER | ACLLEVEL_NOACCESS | ACLLEVEL_MANAGER | ACLLEVEL_EDITOR | ACLLEVEL_DEPOSITOR | ACLLEVEL_DESIGNER |
| 2 | | OtherDomainServers | lab user2 | | | |
| 3 | | Anonymous | LocalDomainServers | | | |
| 4 | | | LocalDomainAdmins | | | |
| 5 | | | | | | |
| 6 | Total No. of users: 6 | | | | | |
| 7 | | | | | | |
| 8 | ABC/testFolder | | | | | |
| 9 | ACLLEVEL_READER | ACLLEVEL_NOACCESS | ACLLEVEL_MANAGER | ACLLEVEL_EDITOR | ACLLEVEL_DEPOSITOR | ACLLEVEL_DESIGNER |
| 10 | | -Default- | lab user2 | | | |
| 11 | | OtherDomainServers | LocalDomainServers | | | |
| 12 | | | LAB3 | | | |
| 13 | Total No. of users: 5 | | | | | |
| 14 | | | | | | |
| 15 | DF Travel Reservation Request database | | | | | |
| 16 | ACLLEVEL_READER | ACLLEVEL_NOACCESS | ACLLEVEL_MANAGER | ACLLEVEL_EDITOR | ACLLEVEL_DEPOSITOR | ACLLEVEL_DESIGNER |
| 17 | | | Satish S Kalal | | | -Default- |
| 18 | Total No. of users: 2 | | | | | |
| 19 | | | | | | |
| 20 | Finance Issues | | | | | |
| 21 | ACLLEVEL_READER | ACLLEVEL_NOACCESS | ACLLEVEL_MANAGER | ACLLEVEL_EDITOR | ACLLEVEL_DEPOSITOR | ACLLEVEL_DESIGNER |
| 22 | | | Lab User3 | | | -Default- |
| 23 | | | LAB3 | | | |
| 24 | Total No. of users: 3 | | | | | |

[Figure: Screenshot of "MIDC Studio - TransPoint" Data Migration interface showing Database Name: TestDB.nsf with a list of forms/templates (Form1, Issues, Labs, Sulu, ErrorList, SLTest, Employee Informatio, AboutMe, TestSubForms, ChckSpace) and a TransPoint dialog (2300) displaying fields labname, lid, chk with Type text, number, checkbox and Level selection with Continue/Cancel buttons.]

though the use of the system and method to migrate from Lotus Notes™ to SharePoint™ is described for
COMPUTERIZED MIGRATION TOOL AND METHOD

RELATED APPLICATIONS

This application claims the benefit of U.S. Provisional Application Ser. No. 61/661,003 filed Jun. 18, 2012, for a "Computerized Migration Tool and Method", and U.S. Provisional Application Ser. No. 61/764,613 filed Feb. 14, 2013, for a "Computerized Migration Tool and Method" which are hereby incorporated by reference in their entireties.

TECHNICAL FIELD

The present disclosure relates generally to computerized systems and methods; in particular, the disclosure relates to a system and method for migrating applications from a legacy platform to another platform.

BACKGROUND AND SUMMARY

There are a wide variety of technologies and platforms from which computer applications can be developed. In some cases, organizations decide to transition legacy applications from one platform or technology to another. This type of migration can be time consuming and fraught with complexity. Transitioning legacy applications is particularly difficult because the migration process needs to capture not only underlying data of users, but also the forms and business logic associated with the applications.

For example, many organizations are decommissioning applications from a product called Lotus Notes™ by IBM of Armonk, N.Y., and are transitioning to a platform based on Microsoft collaboration technologies (e.g., Exchange Server™, SharePoint™ and Office™). One technology to which companies are migrating is Microsoft SharePoint™ offered by Microsoft Corporation of Redmond, Wash., because of its capabilities in creating collaboration, integration and an enterprise portal as per the business need.

According to one embodiment, this disclosure provides a system and method for migrating an application from a legacy platform to another platform. In moving towards adoption of a mature web platform from a legacy platform, such as Lotus Notes™, one step of the migration process can be to leverage a platform, such as Microsoft's SharePoint™ 2010 OOB (out-of-box), with capabilities such as collaboration, content management, business forms, workflows and business intelligence through controlled access, which results in better governance policies and reductions in administration cost.

The next logical step is to extend the OOB capabilities utilizing an application development platform, such as Microsoft's SharePoint 2010™. In the case of using a development platform, such as SharePoint 2010™, advanced capabilities can be utilized, such as integrating with external LOB (line-of-business) applications, data aggregation, search and advanced collaboration through a rapid development and deployment framework. In some cases, this may include the use of cloud computing, such as for services and/or data storage. Since SharePoint 2010™ is supported on a cloud platform (e.g., Office 365™ from Microsoft), this provides an agile business platform available with SharePoint 2010™ and Office 365™ adoption in coming years. In some cases, business processes can be improved and optimized as well, not just migration of the applications "as is."

Thus, in some embodiments, this disclosure provides a system and method that caters to the current Lotus Notes™ to SharePoint™ migration requirements. For example, the system and method can provide an automated, integrated and managed solution for migration of Lotus Notes™ data to SharePoint™. Although the use of the system and method to migrate from Lotus Notes™ to SharePoint™ is described for purposes of example, embodiments are contemplated in which the system/method could be used to migrate to/from other types of platforms and technologies. For example, embodiments are contemplated in which the system/method could be used to migrate a product called eRoom™ from EMC Corporation of Hopkinton, Mass., to SharePoint™. By way of another example, embodiments are contemplated in which the system and method discussed herein could be used to migrate from Lotus Notes™ to a product called Documentum™ from EMC Corporation.

According to another aspect, this disclosure provides a computerized system for migrating one or more applications. The system includes memory for storing instructions and data associated with a computerized migration tool. A processor is configured to execute the stored instructions. The instructions may cause the processor to perform the steps including: analyzing a legacy application to be migrated to a new platform; generating one or more reports showing results of the analysis of the legacy application; migrating a schema of the legacy application to the new platform; and migrating a content of the legacy application to the new platform. The analysis of the legacy application may include determining a complexity of migrating the legacy application to the new platform.

According to a further aspect, this disclosure provides a computerized system for migrating one or more applications. The system includes one or more processing devices and one or more storage devices. The one or more storage devices may store instructions, which, when executed, cause the one or more processing devices to implement: a user interface, a pre-migration analysis unit, and a migration unit. The user interface may be configured with one or more interface elements from which a user can select one or more of an application schema and application content from a legacy application to be migrated to a new platform.

The pre-migration analysis unit may be configured to analyze complexity of migrating the legacy application by counting one or more types of design elements in the legacy application, wherein the pre-migration analysis unit is configured to generate a report based on the analysis of legacy application. The migration unit may be configured to migrate the legacy application to the new platform based on one or more selections on the user interface.

According to yet a further aspect of the present disclosure, a computerized method for migrating applications is disclosed. A legacy application may be analyzed to determine a complexity of migrating a legacy application to a new platform. One or more reports may be generated showing the complexity of migrating the legacy application to the new platform. A schema of the legacy application may be migrated to the new platform. Further, content of the legacy application may be migrated to the new platform. In some cases, portions of the content may be migrated independent of migration of the schema. Also, during migration, links of one portion to another portion of the content may be preserved.

According to yet a further aspect of the present disclosure, a computer program product comprising a non-transitory computer readable medium is disclosed. The medium may comprise: code for analyzing a legacy application to determine a complexity of migrating the legacy application to a new platform; code for generating one or more reports showing the complexity of migrating the legacy application to the new platform; code for migrating a schema of the legacy application to the new platform; and code for migrating a content of the legacy application to the new platform.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which:

FIGS. 4-7 are example screenshots showing exportation and reports of data from the complexity analysis according to one embodiment of the present invention;

FIG. 11 is an example screenshot showing a user interface that allows customization of the schema to be migrated according to one embodiment of the present invention;

FIGS. 21-23 are example screen shots showing an embodiment for migrating selected records.

Figure 1:
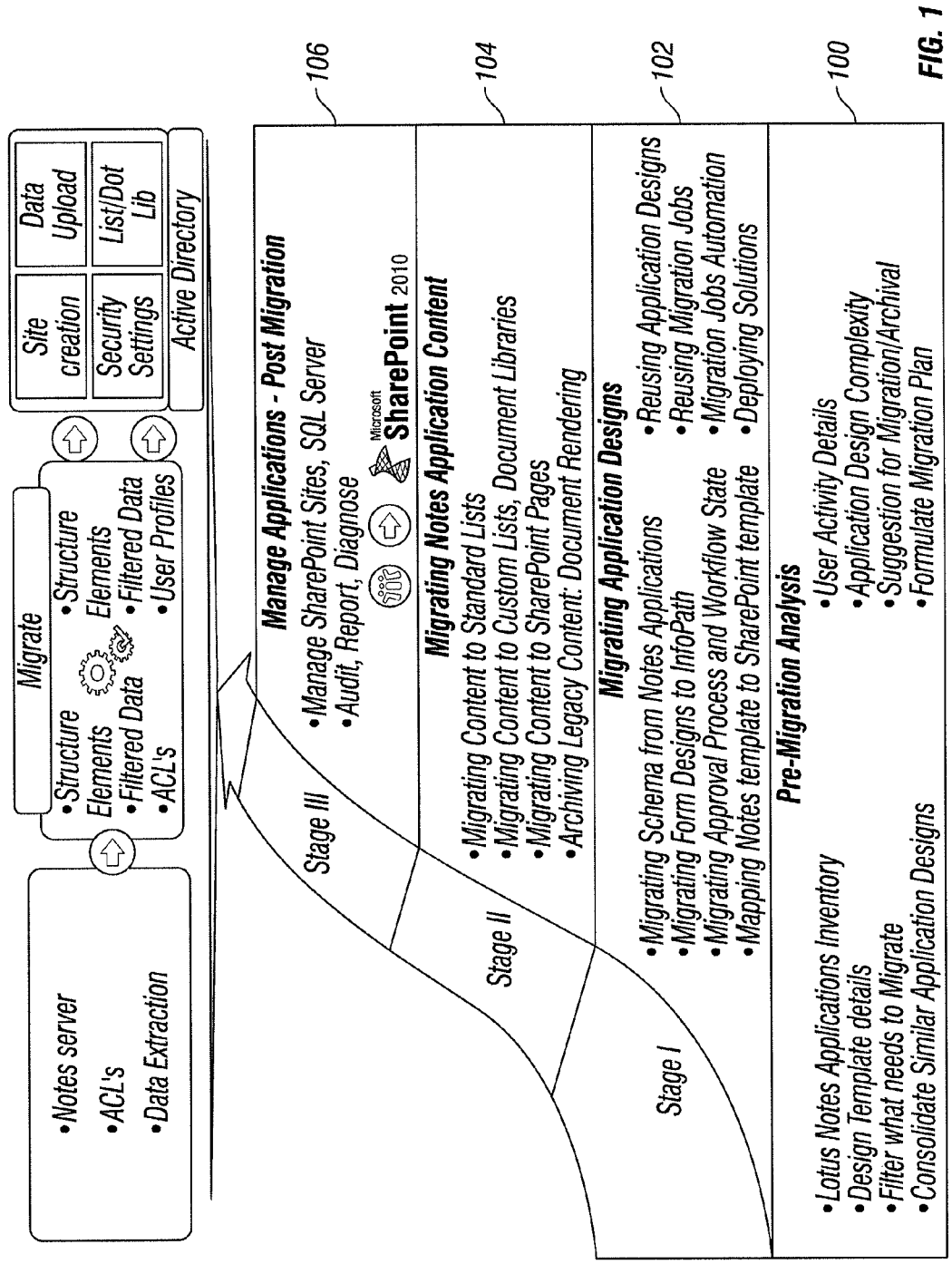
FIG. 1 is a diagram showing possible steps in the process of migrating a legacy application to a new platform according to one embodiment of the present invention.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

This disclosure relates to a system and method for migrating a legacy application from one platform or technology to another. Although this will generally be described below with respect to a migration from Lotus Notes™ to SharePoint™, this is done for purposes of example. This disclosure is not intended to be limitedly solely to the migration from Lotus Notes™ to SharePoint™, but encompasses the migration of other applications. For example, embodiments are contemplated in which the system/method could be used to migrate a product called eRoom™ from EMC Corporation of Hopkinton, Mass. to SharePoint™. By way of another example, embodiments are contemplated in which the system and method discussed herein could be used to migrate from Lotus Notes™ to a product called Documentum™ from EMC Corporation.

FIG. 1 is a diagram showing possible steps that may be performed to migrate one or more applications from the Lotus Notes™ platform to the SharePoint™ platform. In the example shown in FIG. 1, the process includes a pre-migration analysis 100, a first stage process of migrating application designs 102, a second stage process of migrating application content 104, and a third stage post-migration process 106.

In this embodiment, the pre-migration analysis 100, which may be performed by a pre-migration analysis unit, may include an analysis regarding the complexity of the legacy application to be migrated, which is a Lotus Notes™ application in this example. An example of this analysis is described below with respect to FIGS. 2-3. This could include, for example, an evaluation of the time and cost estimation for the migration. An example of reporting capabilities is described below with respect to FIGS. 4-7. Below is a non-exhaustive list of possible actions that could be taken in the pre-migration stage:

Applications inventory
Design template details
Filter what needs to migrate
Consolidate similar application designs
Document user activity details
Analyze application design complexity
Provide suggestions/recommendations for migration/archival
Formulate migration plan In this example, the first stage of the migration process, which may be performed by the migration unit, includes the migration of application designs 102. This could include, for example, the migration of the application schema. In one embodiment, the schema can be migrated "as is"—in the same structure as the legacy application. Other embodiments are contemplated in which the schema could be customized during the migration, such as to take advantage of the new platform's capabilities. Embodiments are also contemplated in which the schema migration process could include field level selection and field name editing. Below is a non-exhaustive list of possible actions that could be taken to migrate application designs:

Migrating schema from legacy (e.g., Notes™) applications
    Migrating form designs to form designer, such as Infopath by Microsoft
    Migrating approval process and workflow state
    Mapping Notes™ template to SharePoint™ template
    Reusing application designs
    Reusing migration jobs
    Migration jobs automation
    Deploying solutions In the example shown in FIG. 1, the second stage of the migration process, which may also be performed by the migration unit, is migrating application content from the legacy application, such as content from Lotus Notes™ applications in the example shown. In one embodiment, this could include the entire migration of content, including migration of rich text with formatting, attachments, links and embedded objects. Depending on the circumstances, this could also include the migration of access control lists ("ACLs") to forms-based authentication ("FBA"). Additionally, migration of discussion boards could be template-based. In some cases, content could be mapped to an existing application, such as a SharePoint™ site. Below is a non-exhaustive list of possible actions that could be taken to migrate application content:

Migrating content to standard lists
    Migrating content to custom lists, document libraries
    Migrating content to SharePoint™ pages
    Archiving legacy content: document rendering In the third stage of the migration process, in the embodiment shown in FIG. 1, post-migration tasks can be performed, for example, by a post-migration unit. This could include management of the migrated application(s), such as management of SharePoint™ sites and SQL server in the case of a migration to SharePoint™. In some cases, this may include auditing, reporting and diagnosis of the application(s).

Figure 2:
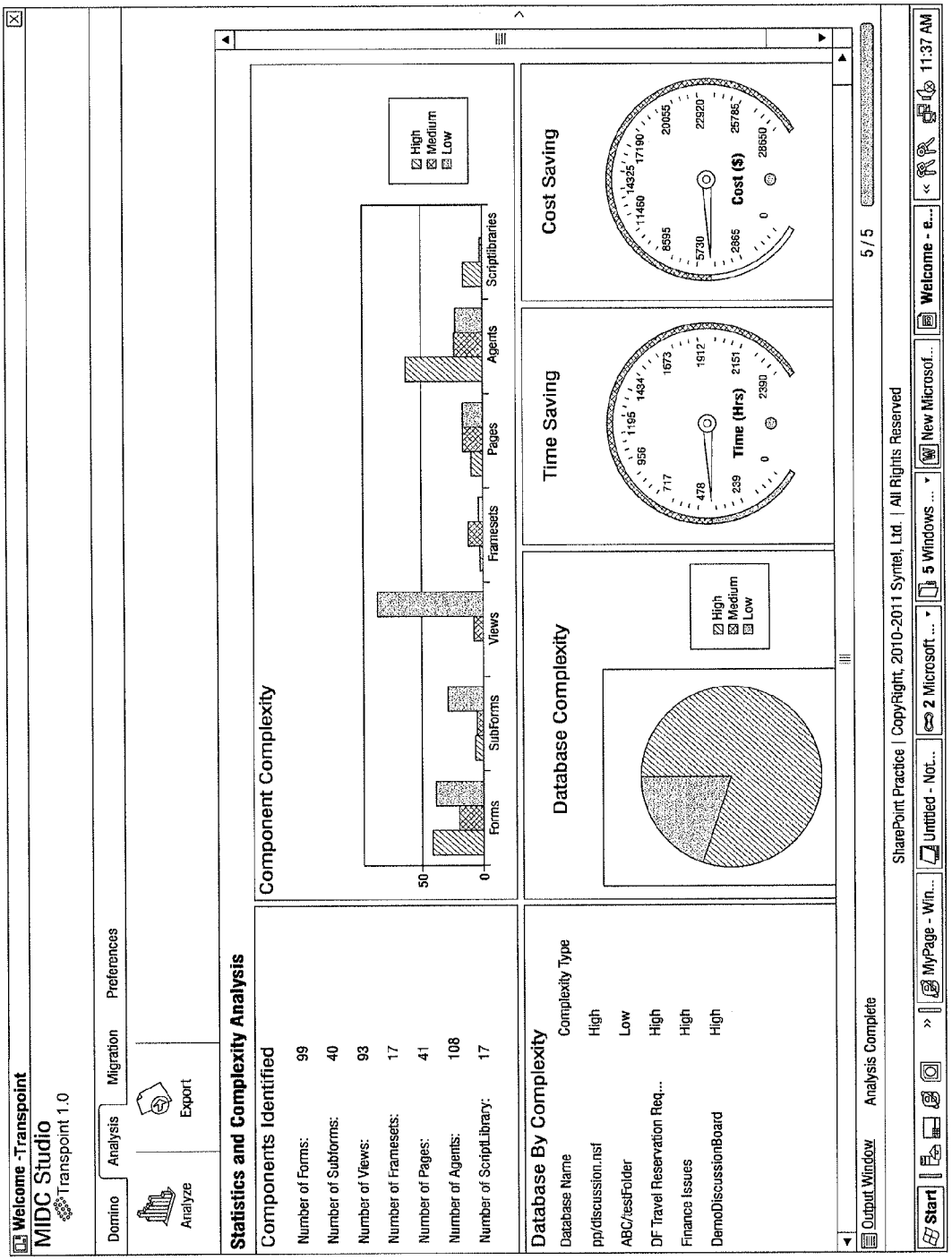
FIGS. 2-3 are example screenshots showing an analysis of complexity to migrate a legacy application according to one embodiment of the present invention.
Figure 3:
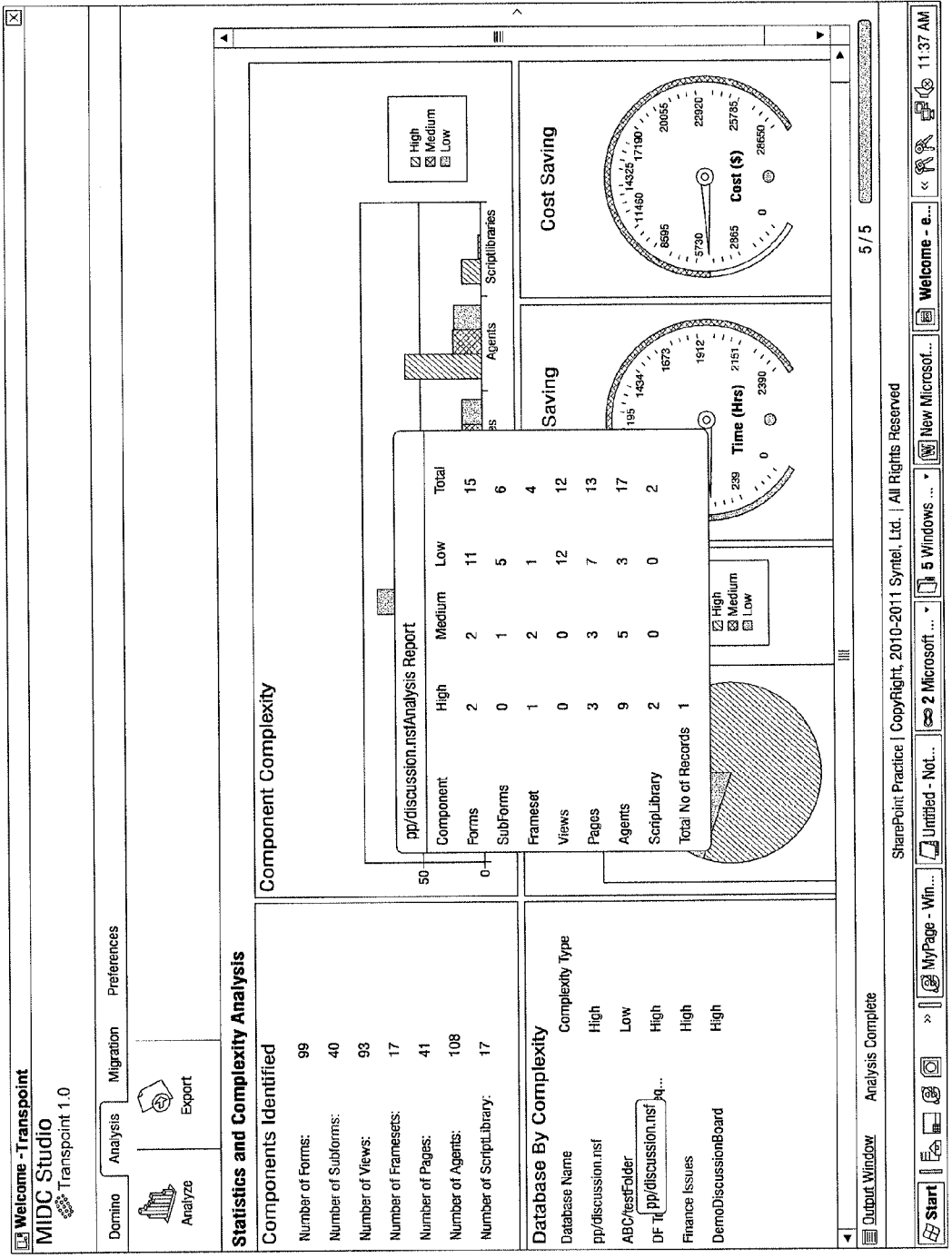
Figure 5:
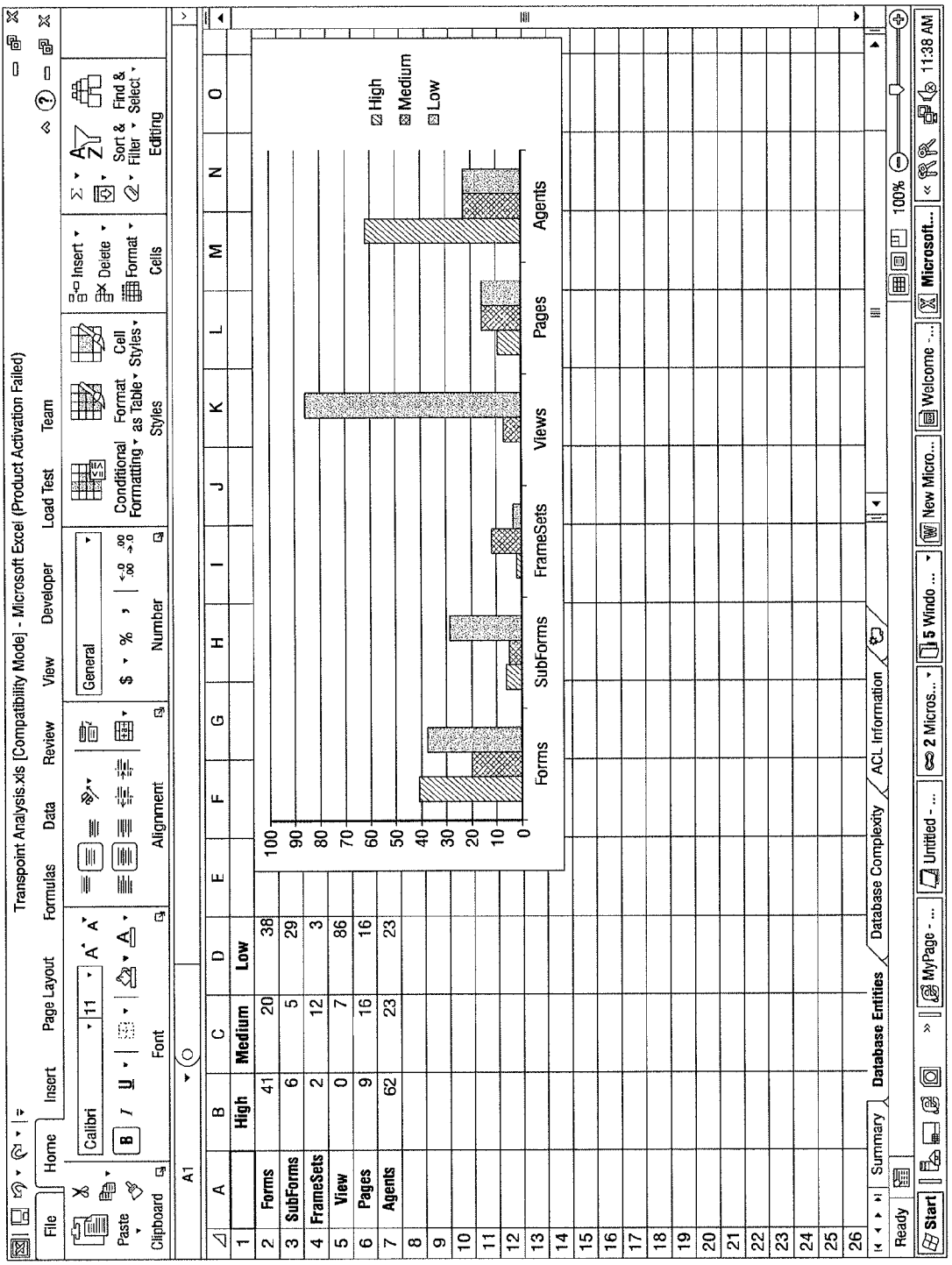
Figure 6:
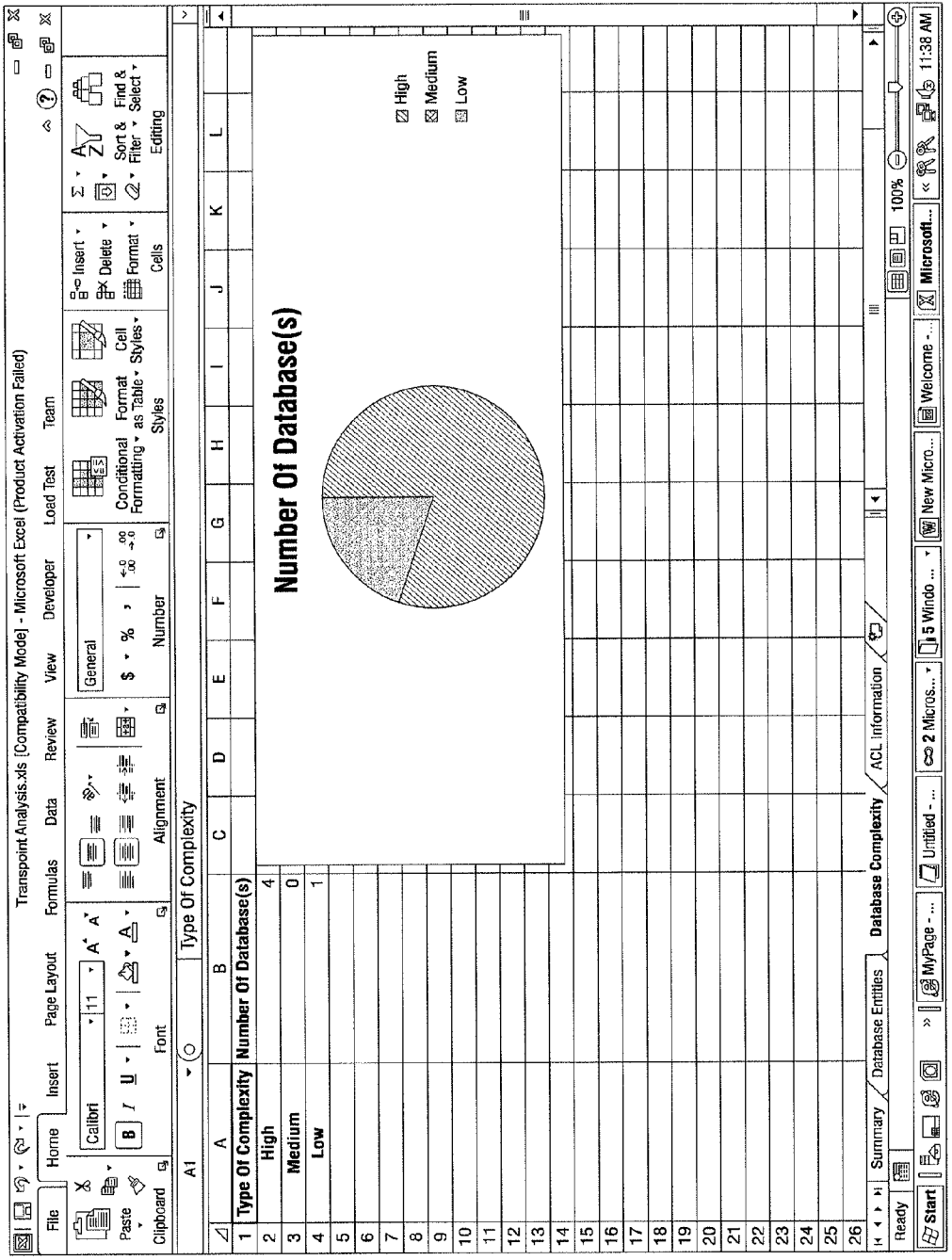

According to embodiments of the present disclosure, the pre-migration analysis unit may perform the processes illustrated in the example screenshots shown in FIGS. 2-7. FIGS. 2 and 3 show example screenshots of the portion of the system that analyzes the complexity of the application to be migrated. For example, the system can provide detailed assessment reports about the legacy application, thus catering to above business scenarios. Before migrating Notes™ applications to SharePoint™, for example, it is helpful to take careful stock of the legacy application's environment. For example, it may be helpful to determine:

How many Notes™ databases are there and which will be appropriate to move to SharePoint™?
    Which applications will translate easily to standard SharePoint™ templates and which will require a significant amount of custom configuration or development?

Many organizations do not have a ready answer to these questions, which makes it difficult to estimate the timeframes and cost of the transition. Depending on the circumstances, the composition of the various databases could be scanned to determine how big they are, which ones have large number of documents, who has access to them, who the content authors are, and so on. Embodiments are contemplated in which data from these reports could be exported, such as for use in Microsoft Excel™.

In one embodiment, prior to the migration process, the system analyzes the complexity of applications to be migrated. For example, the system could count the number of forms, agents, and other design elements and classify their complexity level (i.e., High, Medium and Low) in order to give a preliminary estimate of design complexity. In some cases, manual analysis could be supported, which makes it easy to adjust the tool-calculated numbers for accuracy.

As used herein, the term "complex" does not necessarily mean "hard to migrate." There are many cases in which a Notes™ database could look complex in Domino Designer™, but could be easily replaced by existing site templates or implemented with out-of-the-box SharePoint™ features. Consider an example with a Lotus Notes™ application having five databases. The system could analyze each of them in depth and provide a detailed analysis report as shown in FIGS. 2-3. In one embodiment, the report may include, but is not limited to:

Number of databases associated with the application and complexity of each.
    Details of each database, such as the number of forms, sub-forms, framesets, views, pages and agents, along with the level of complexity.
    Time and cost.

In analyzing components/databases of the application(s) to be migrated, one method for rating complexity could be as shown in the chart below:

| Level of Notes ™ Application Complexity | |
|---|---|
| Low | Maps to standard SharePoint ™ template<br>No code customization<br>Redevelop using out-of-box SharePoint ™ features |
| Medium | Redevelop using out-of-box SharePoint ™ features/Designer/<br>InfoPath without writing code |
| High | Contains Notes ™ customizations that may be replaced with out-of-box SharePoint ™ features<br>Redevelop using SharePoint ™ Designer/<br>InfoPath with low custom code |
| Very High | Redevelop using out-of-box SharePoint ™ features/Designer/<br>InfoPath/Visual Studio<br>Requires deploying custom code to SharePoint ™ servers |

This chart shows possible complexity ratings for a legacy application, such as Notes™, for purposes of example only. Although four levels of complexity is shown in the above chart, it should be appreciated by one skilled in the art that more than four levels or less than four levels could be used. Likewise, the mapping of issues into the levels of complexity could differ depending on the circumstances.

Figure 4:
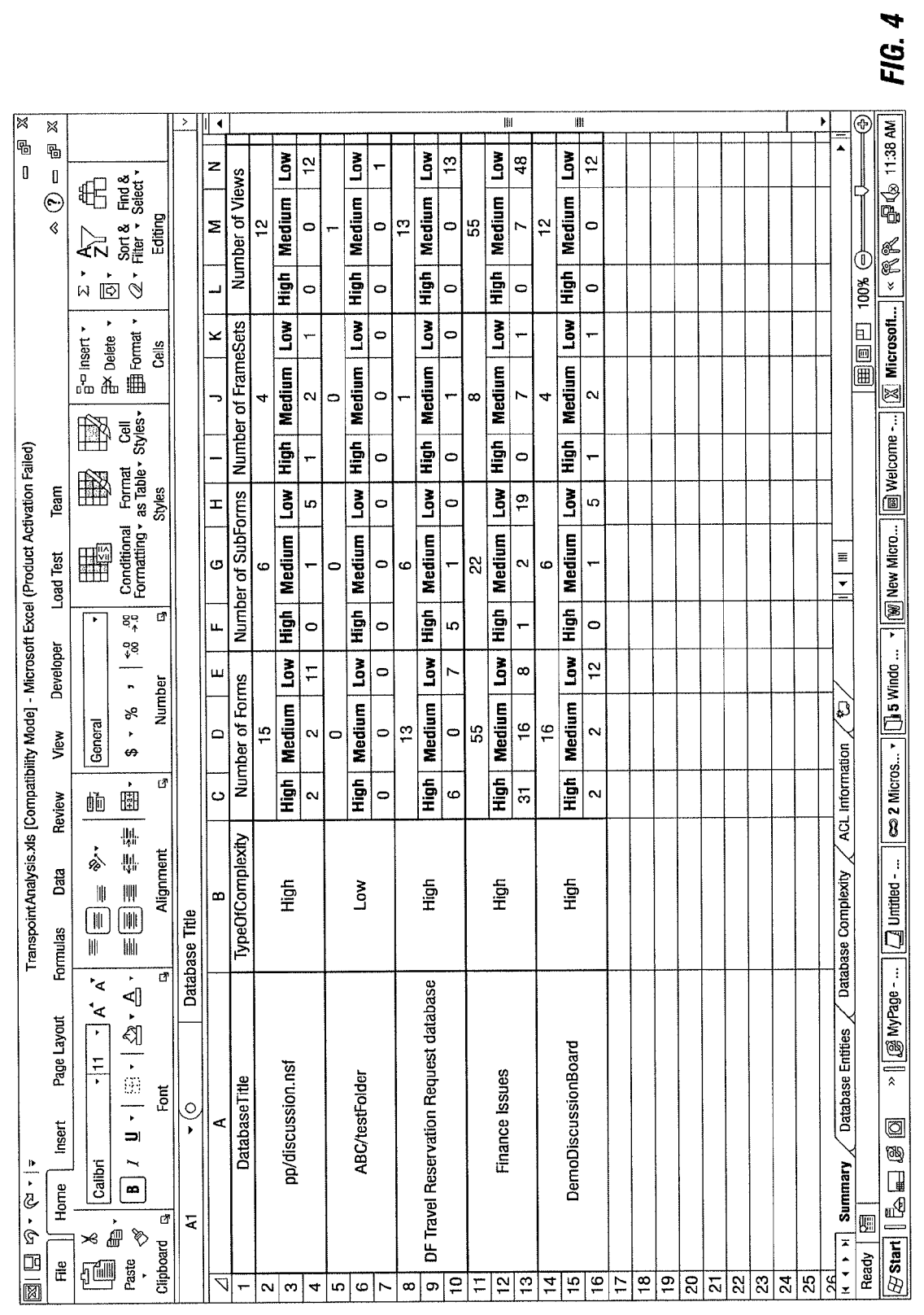

In one embodiment, the analysis of the legacy application can be exported for data analysis. For example, the analysis could be exported to a spreadsheet, such as Microsoft Excel™. FIG. 4 shows an example summary report with an overview of all databases selected for analysis. In this example report, the overall complexity rating, along with a presentation regarding the number of forms, subforms, framesets, and views for each analyzed database is shown. The report shown in FIG. 5 includes database entities and details regarding complexity. In this example, the user is presented with a chart showing analysis of forms, subforms, framesets, views, pages, and agents. The example report shown in FIG. 6 includes a graphical representation of the complexity of the databases associated with the legacy application. FIG. 7 shows an example report of user information with their access levels.

According to embodiments of the present disclosure, the migration unit may perform the processes illustrated in the example screenshots shown in FIGS. 8-23. Prior to starting with the actual data migration process, the schema(s) for the database(s) is migrated. In one embodiment, the system provides two options for doing this: (1) an "as is" schema migration and (2) customized schema migration with field level selection and field name editing options.

Figure 8:
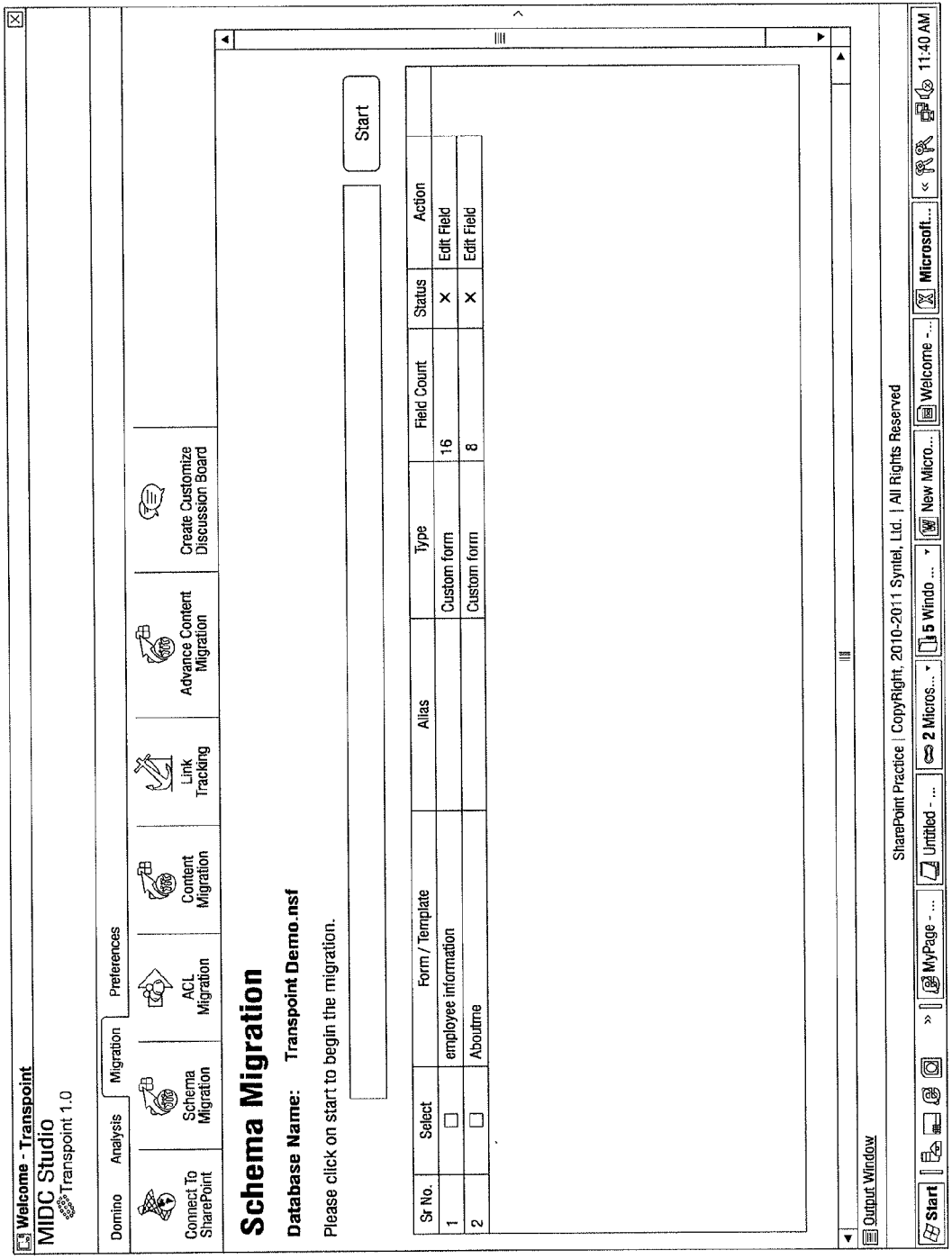
FIGS. 8-10 show example screenshots of an "as is" schema migration according to one embodiment of the present invention.
Figure 9:
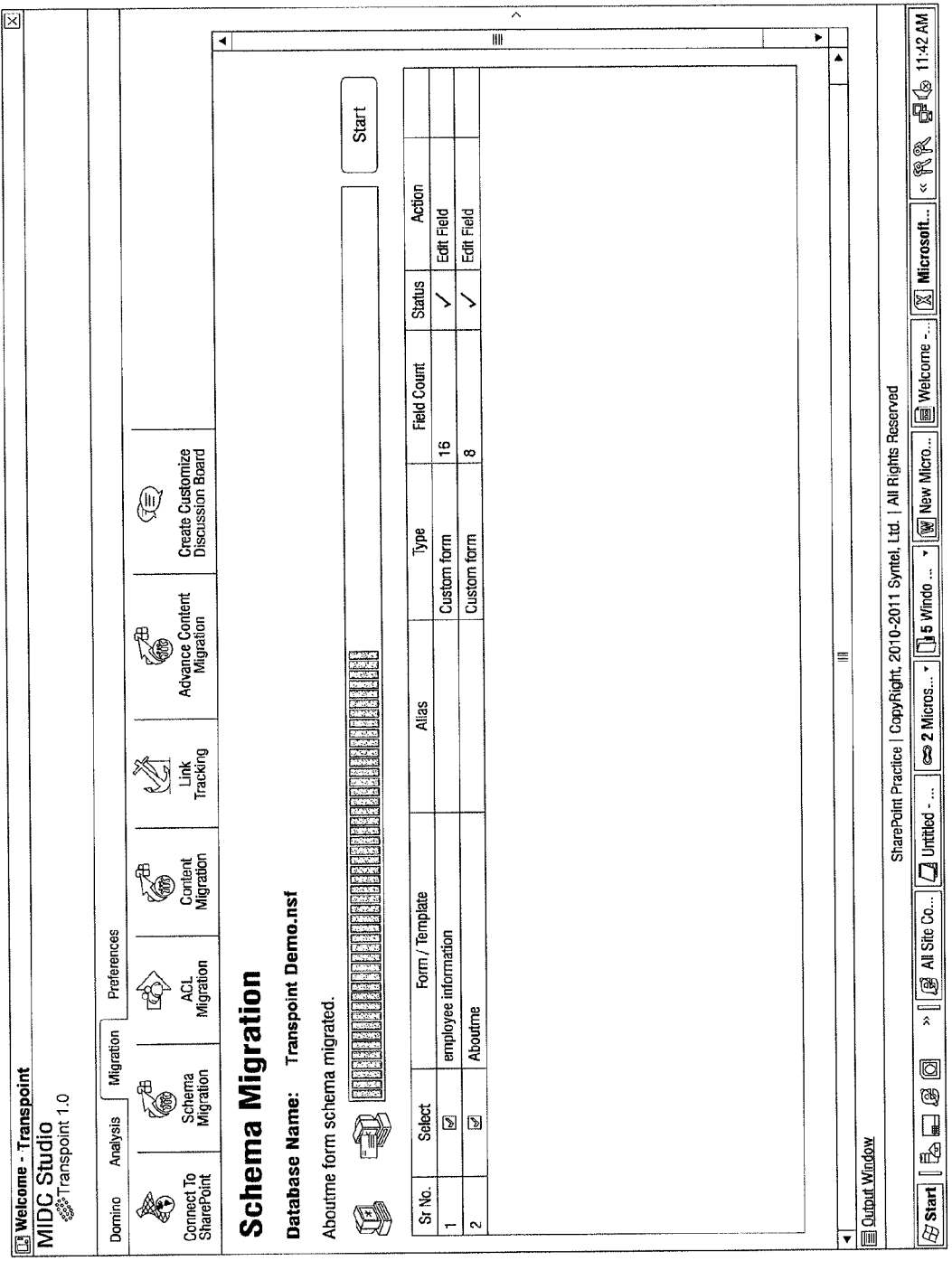
Figure 10:
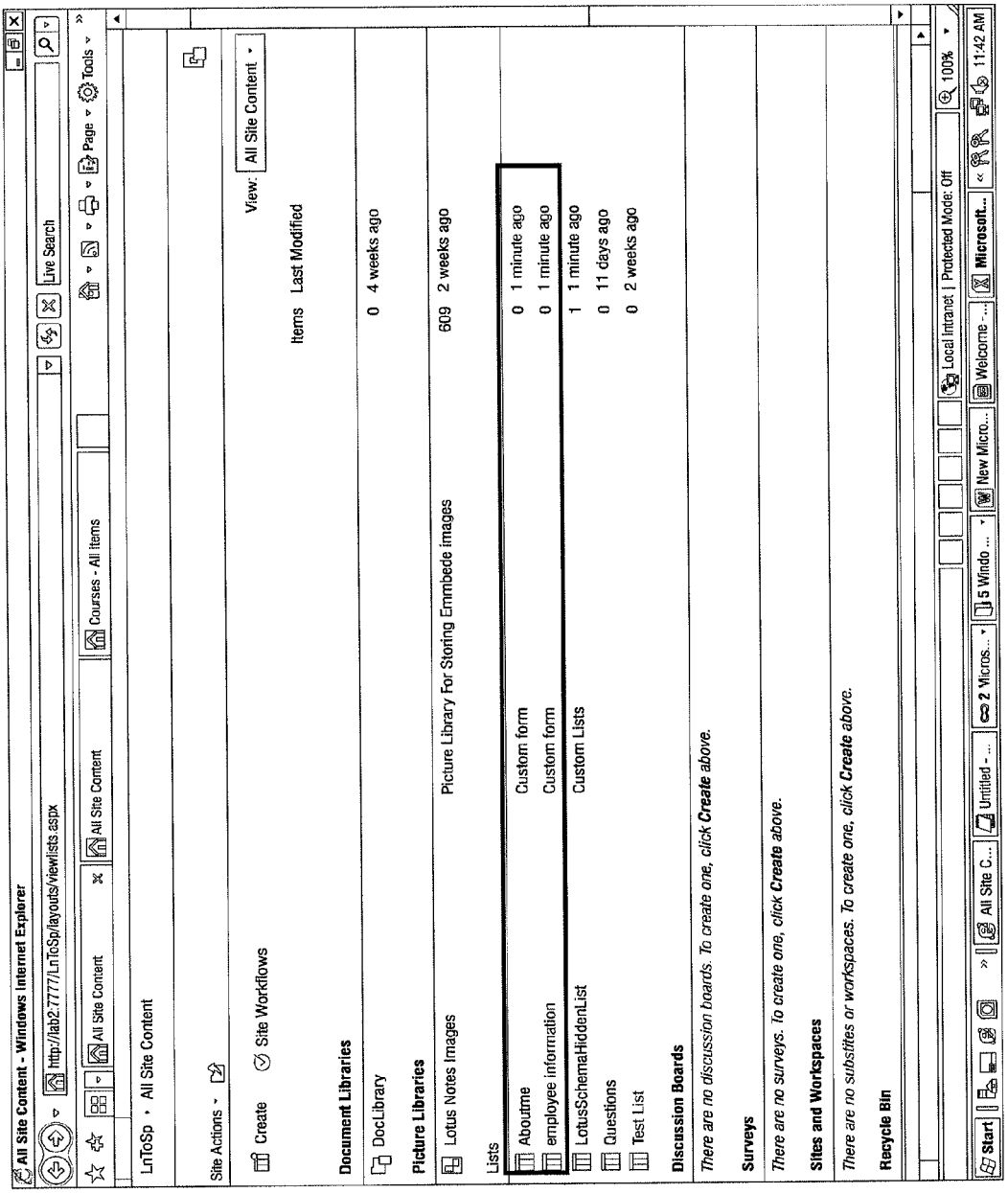

FIGS. 8-10 are example screenshots of the "as is" schema migration. One of the tasks when migrating custom Notes™ applications is often to provide a new custom SharePoint™ template that has the same important data fields as the old Notes™ application, with the proper field names and data types. Because a custom Notes™ application may have dozens or even hundreds of fields, the system contains features to help automate this task by providing "as is" schema migration. This results in a copy of the schema for use with SharePoint™ in this example. FIG. 8 shows an example screenshot in which a user may select forms for which schema needs to be migrated.

FIG. 9 shows an example screenshot from which the user can see the migration process of the schema. Once the schema is migrated successfully to SharePoint™, the migrated schema can be seen as lists on SharePoint™ site. FIG. 10 is an example screenshot showing the schema migrated to the SharePoint™ server as a SharePoint™ List.

Figure 11:
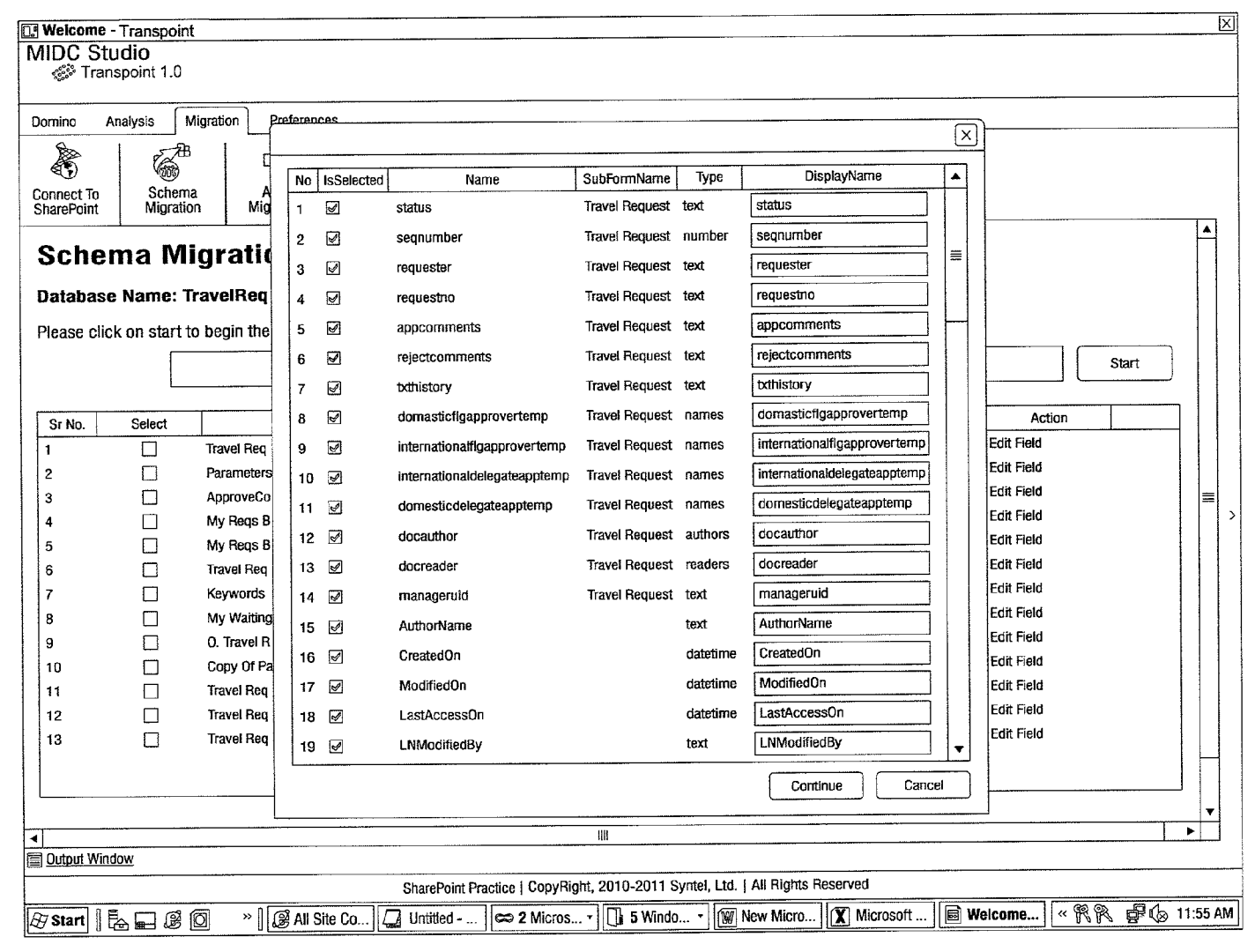

In some cases, the migration of all the fields in a form may not be needed or the organization migrating the legacy application may want to change the field names before a form is migrated to the legacy application. In such circumstances, the system allows customization of the schema to be migrated. For example, the fields to be migrated can be selected; in some cases, the names for list items can be edited. FIG. 11 is an example screenshot showing a user interface that allows customization of the schema to be migrated. In the example shown, there is a checkbox that allows the user to select or deselect particular fields. In this example, the interface includes a textbox that allows a user to customize the names of fields. Although these user interface elements are shown for purposes of example, one skilled in the art should appreciate that the user interface could have varying visual designs using a wide variety of interface elements for selection and customization of the schema to be migrated.

Once the schema migration is complete, the content for the application can be migrated. In one embodiment, content can be migrated to standard lists and custom lists, and legacy content can be archived.

With respect to standard lists, Lotus Notes™ came with many standard application templates that were widely used (with or without customization), including discussion databases, calendars, task lists, team sites, contact lists, and document libraries. In all these cases, there is an out-of-the-box SharePoint™ template design available. The user interfaces of these templates may be a little different, but all of the functionality is available, which is why content can be migrated to the relevant template.

Custom lists in SharePoint™ are just like lists based on standard templates, except that all the data columns (and possibly other list settings) are defined. When migrating a custom Notes™ application to a custom list, the main activity is mapping all the fields in the Notes™ database to the columns in the custom list.

If there are many Notes™ databases to migrate, a good number of them are likely no longer being actively used to create new documents but still contain valuable reference data. With applications like that, it may not be advisable to invest time and energy to rebuild the forms and functionality. Instead, the content may be archived in SharePoint™ so that it looks good and is searchable by users. Accordingly, the system can migrate all content without data loss. For example, the system may be configured to carry out validation checks post-migration to notify the user if any issues arise. However, in one embodiment, the system ensures "as is" migration for rich text fields, attachments, embedded images, document links, etc.

Figure 12:
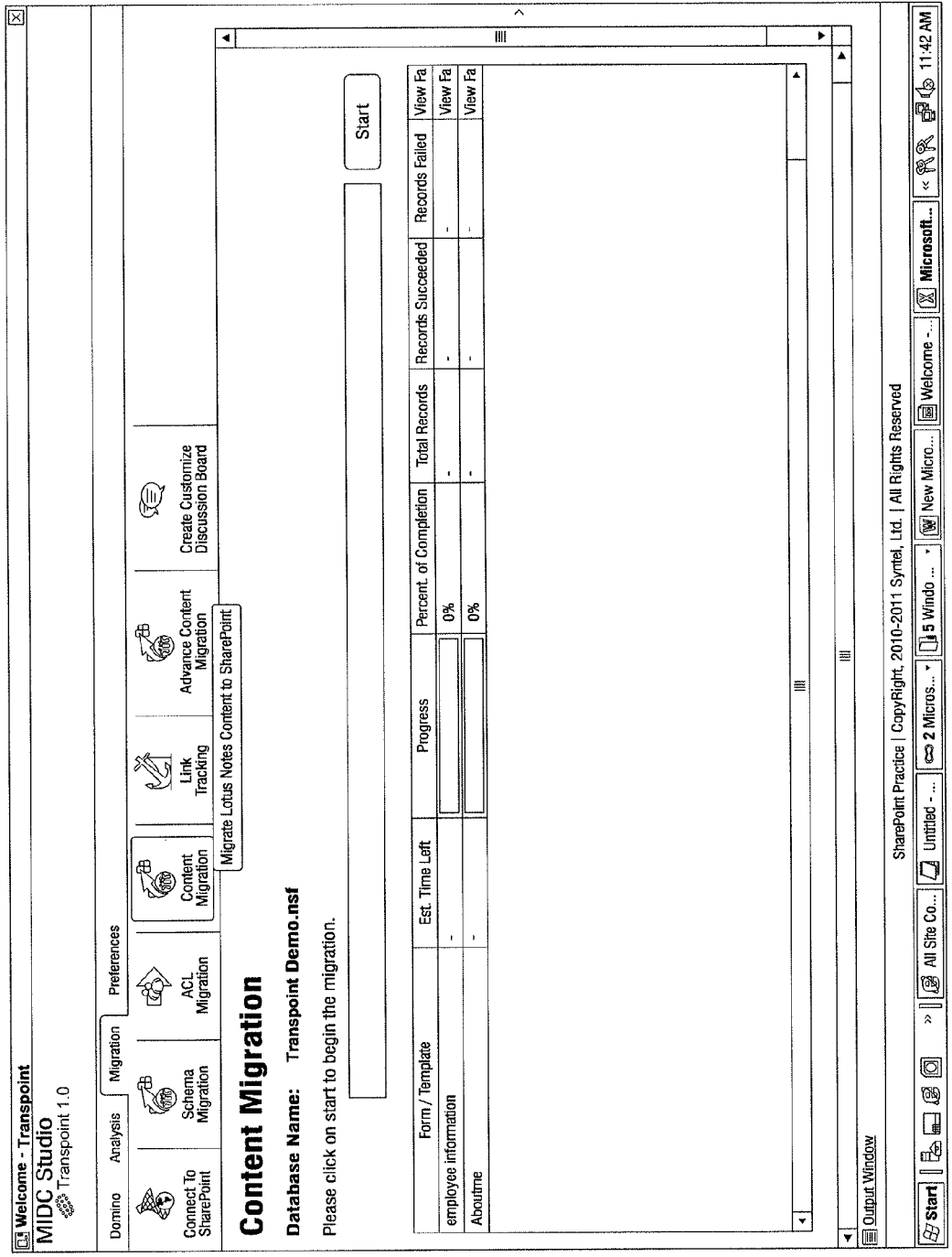
FIG. 12 is an example screenshot from which the user can see the forms for which schema has already been migrated according to one embodiment of the present invention.
Figure 13:
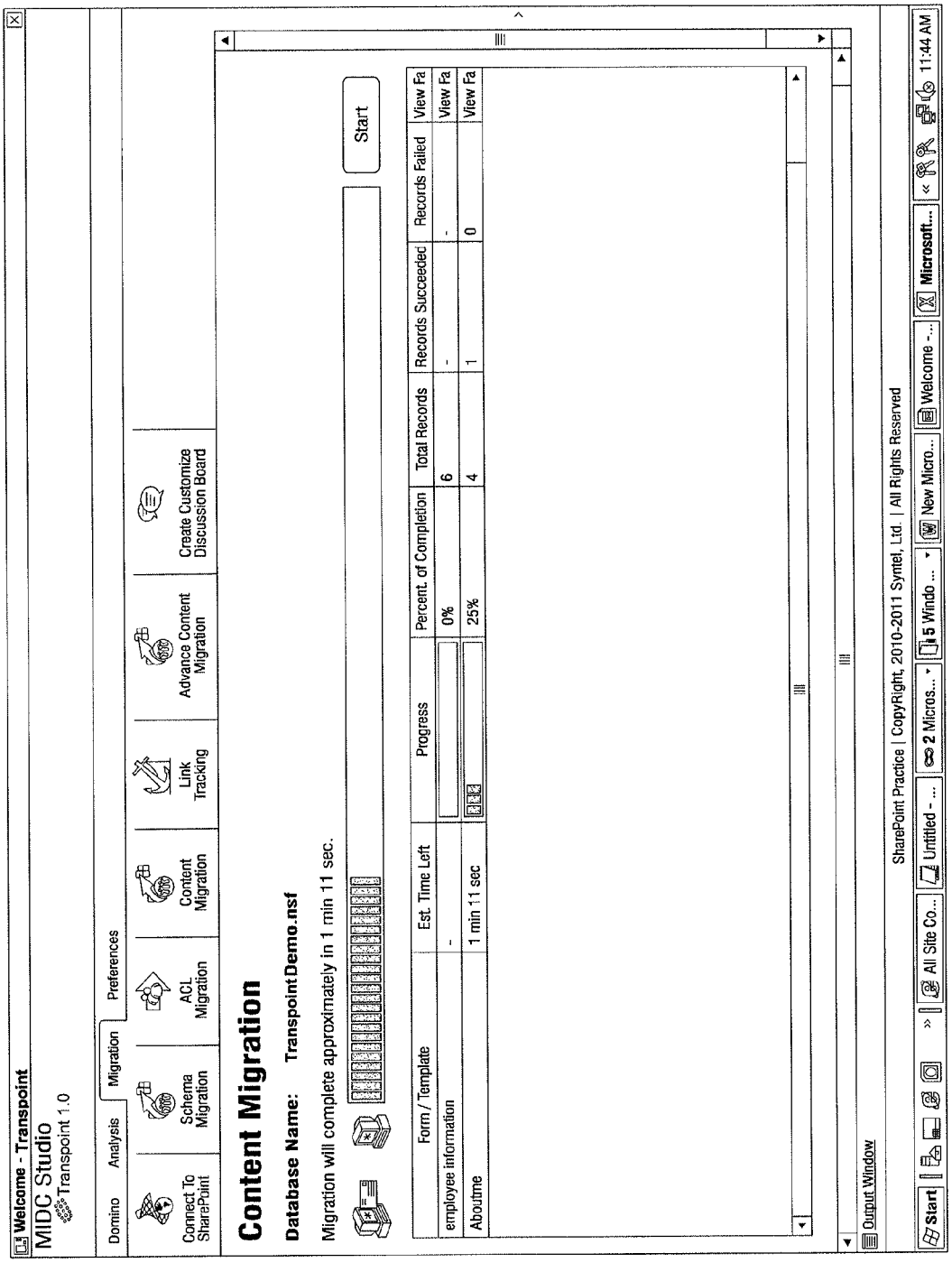
FIG. 13 is an example screenshot showing the content migration progress according to one embodiment.
Figure 14:
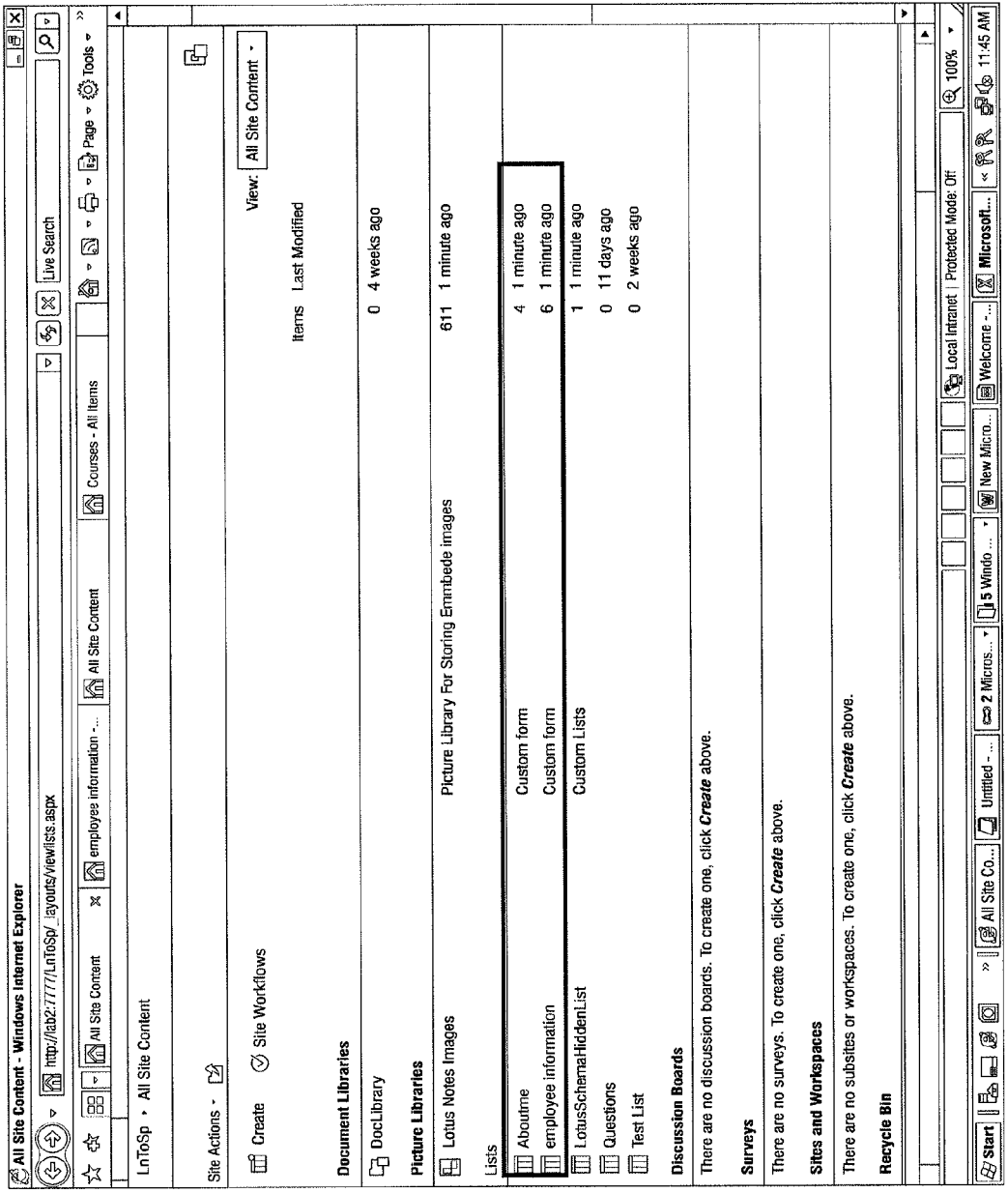
FIG. 14 is an example screenshot showing content migration as a list after a successful content migration according to one embodiment.
Figure 15:
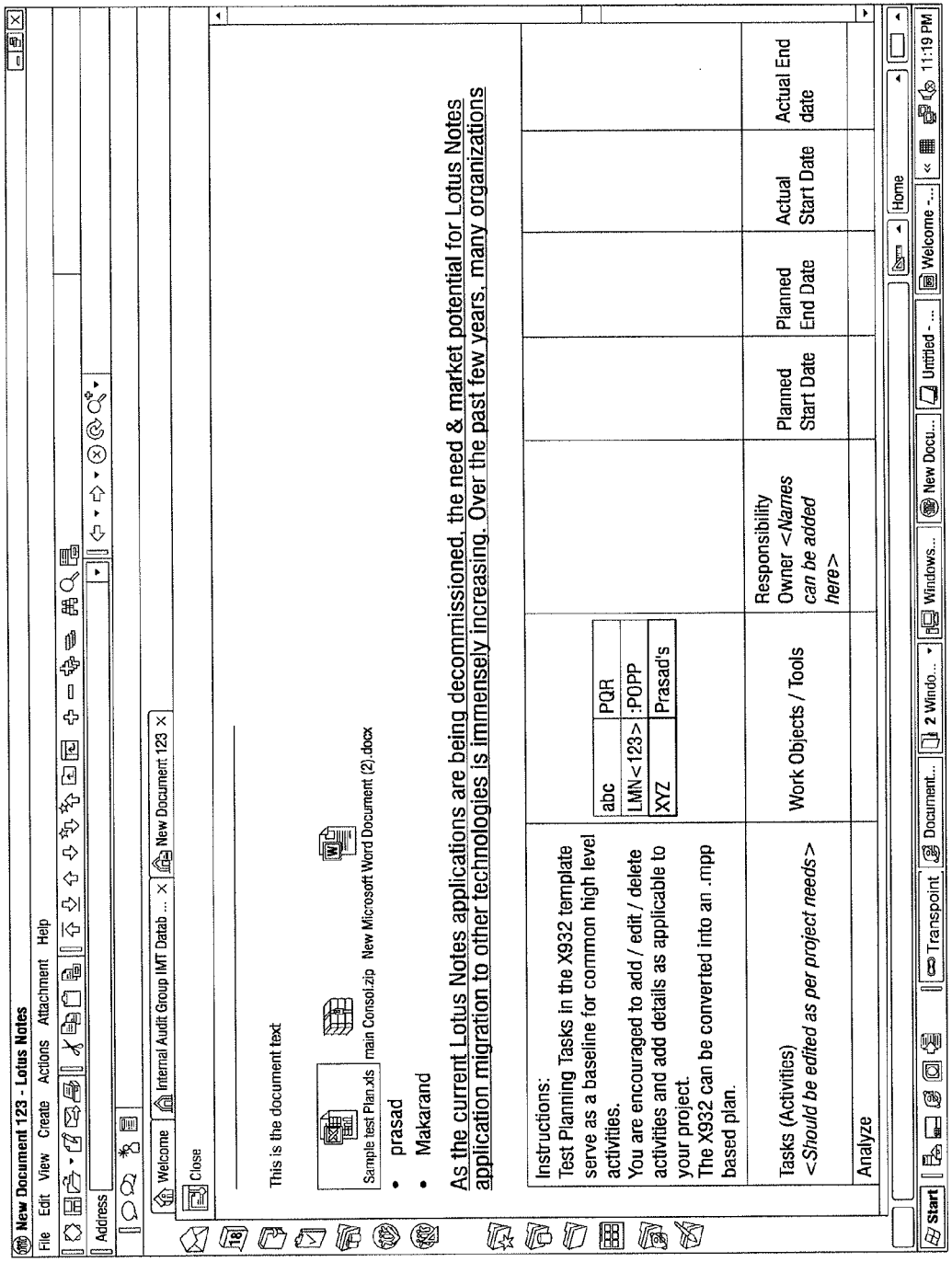
FIG. 15 shows an original document with rich text prior to migration.
Figure 16:
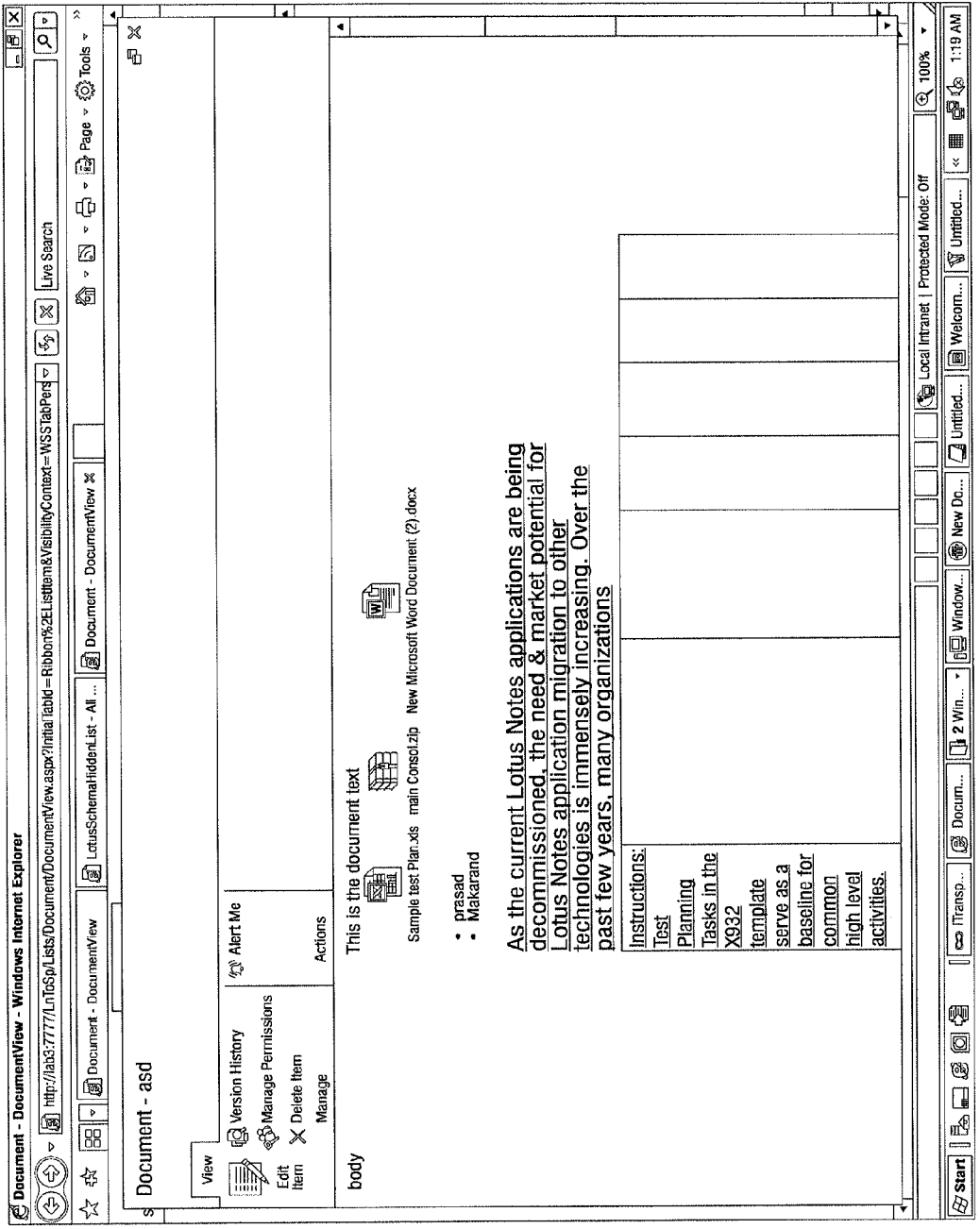
FIG. 16 shows the document with rich text of FIG. 15 after migration.

FIG. 12 shows an example screenshot from which the user can see the forms for which schema has already been migrated. FIG. 13 is an example screenshot showing the content migration progress. In this example, the user is presented with the percentage completed, record success and failure count. After a successful content migration, this information can be seen on the new platform, such as the SharePoint™ server, as a list of items, as shown in FIG. 14. FIG. 15 shows an original Lotus Notes™ document with rich text to be migrated. Once documents are successfully migrated, the same can be seen in the SharePoint™ site along with the rich text, as shown in FIG. 16.

Figure 17:
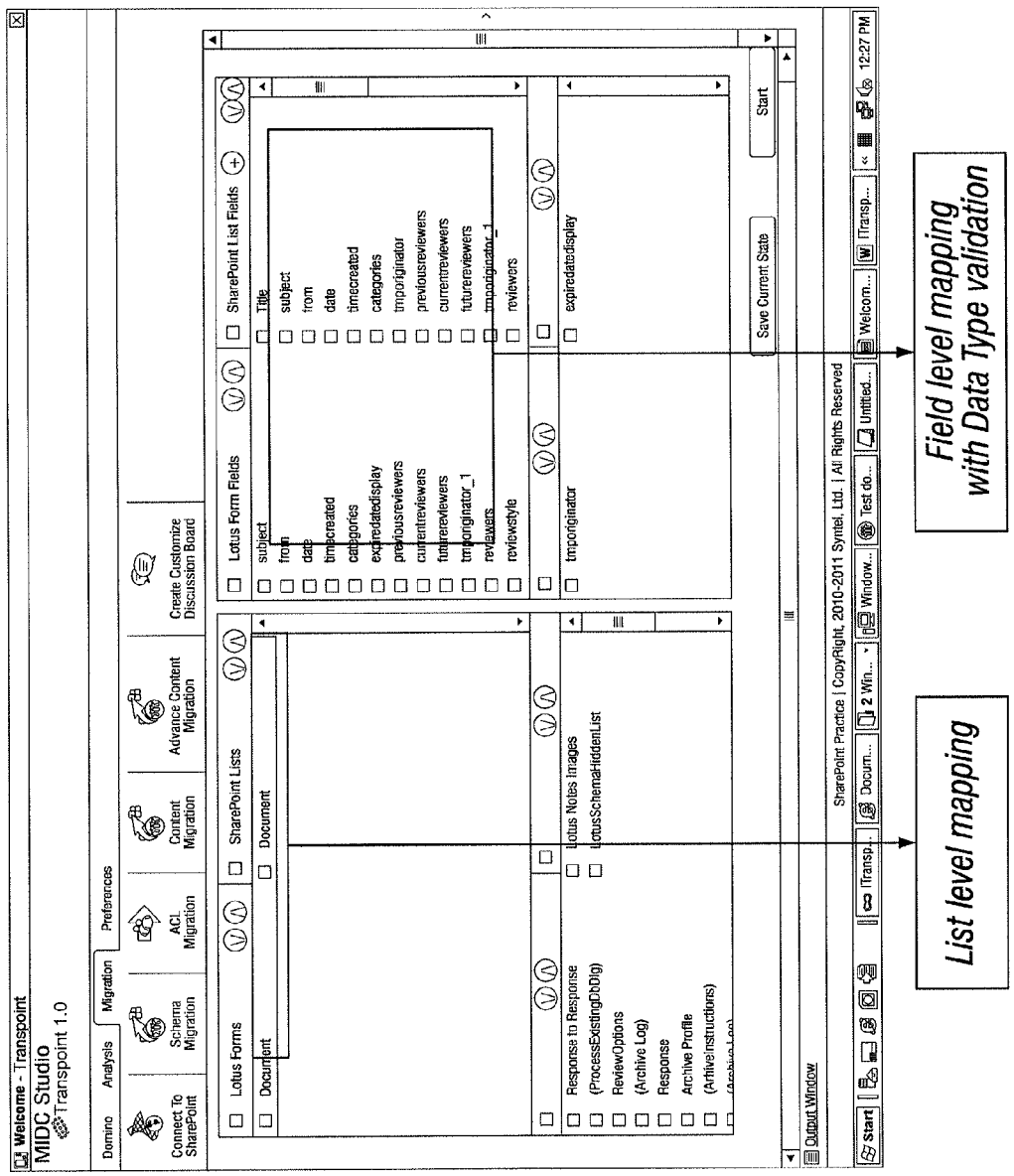
FIG. 17 is an example screenshot showing one to one mapping of entities between the legacy application and new platform involved in migration according to one embodiment.

In some cases, the system may provide advanced content migration. For example, if the Notes™ application is identical to any preexisting SharePoint™ site, then direct migration of the data without migrating the schema is possible, thus saving time and cost. FIG. 17 is an example screenshot showing one to one mapping of Notes™ and SharePoint™ entities involved in a migration. In this example, list level and field level mapping with data type validation is provided.

Figure 18:
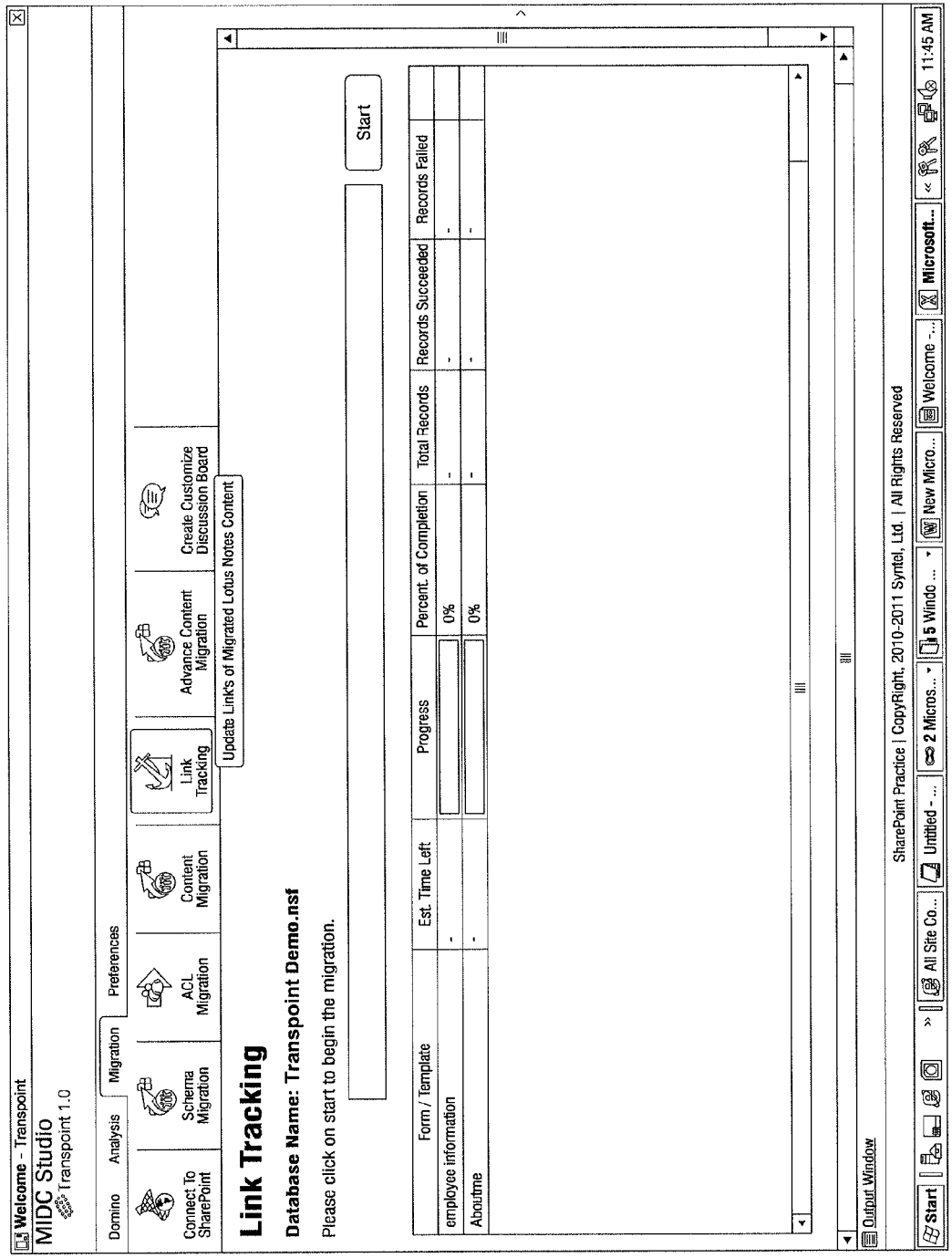
FIG. 18 is an example screenshot that shows forms that the user can select for purposes of link tracking according to one embodiment.
Figure 19:
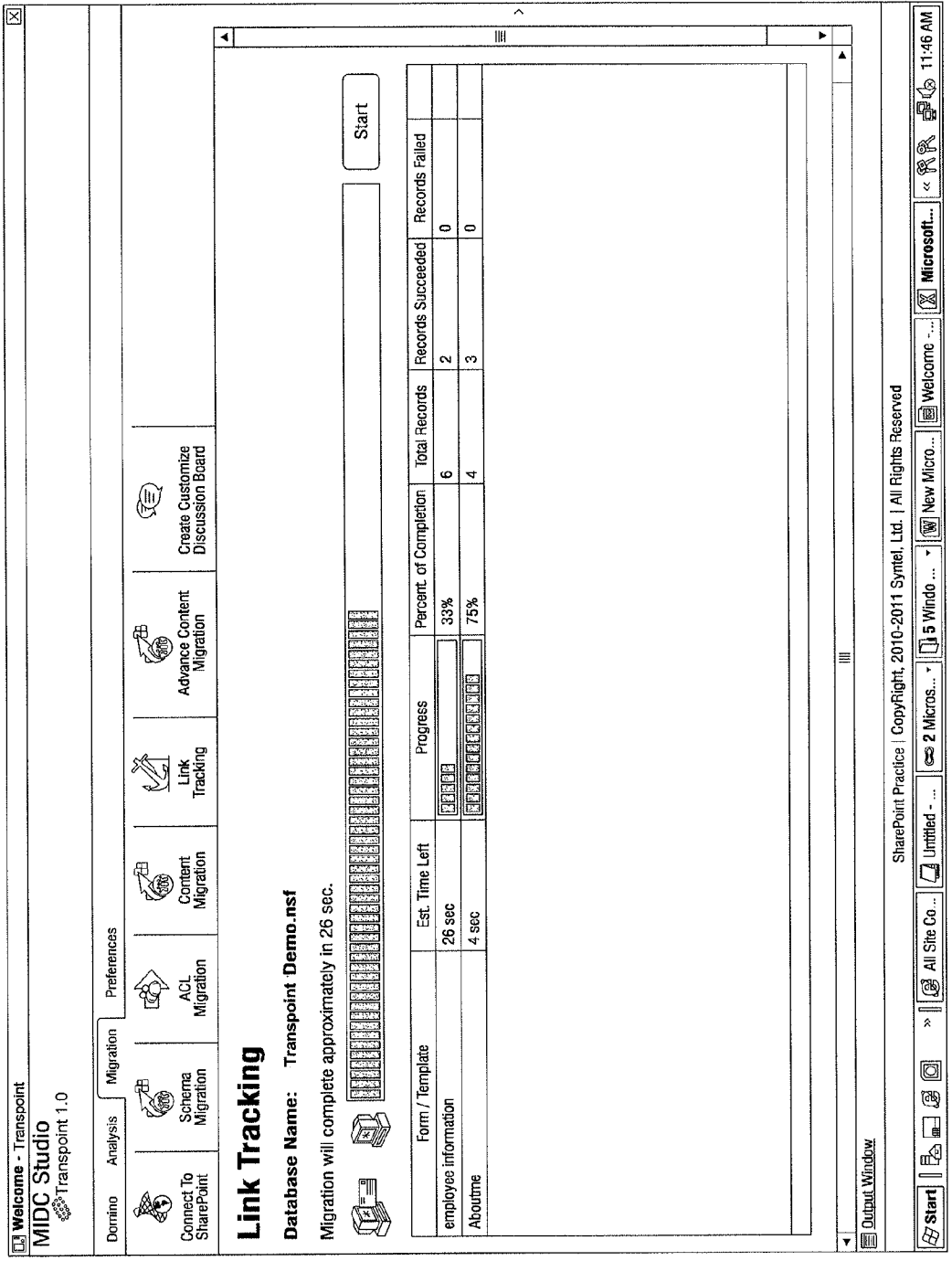
FIG. 19 is an example screen showing link tracking progress according to one embodiment.

In some embodiments, the system may be configured to provide link tracking. For example, a typical Lotus Notes™ application may contain documents that have links to other documents in the same database or different database. The system may be configured to preserve these links as is. In some cases, there is a separate tab in the interface which takes care of link tracking. FIG. 18 is an example screenshot that shows all forms and the user can select the forms where they want to perform link tracking and then click "start." FIG. 19 is an example screenshot that shows link tracking progress, specifying the percentage completed, record success and failure count.

Figure 20:
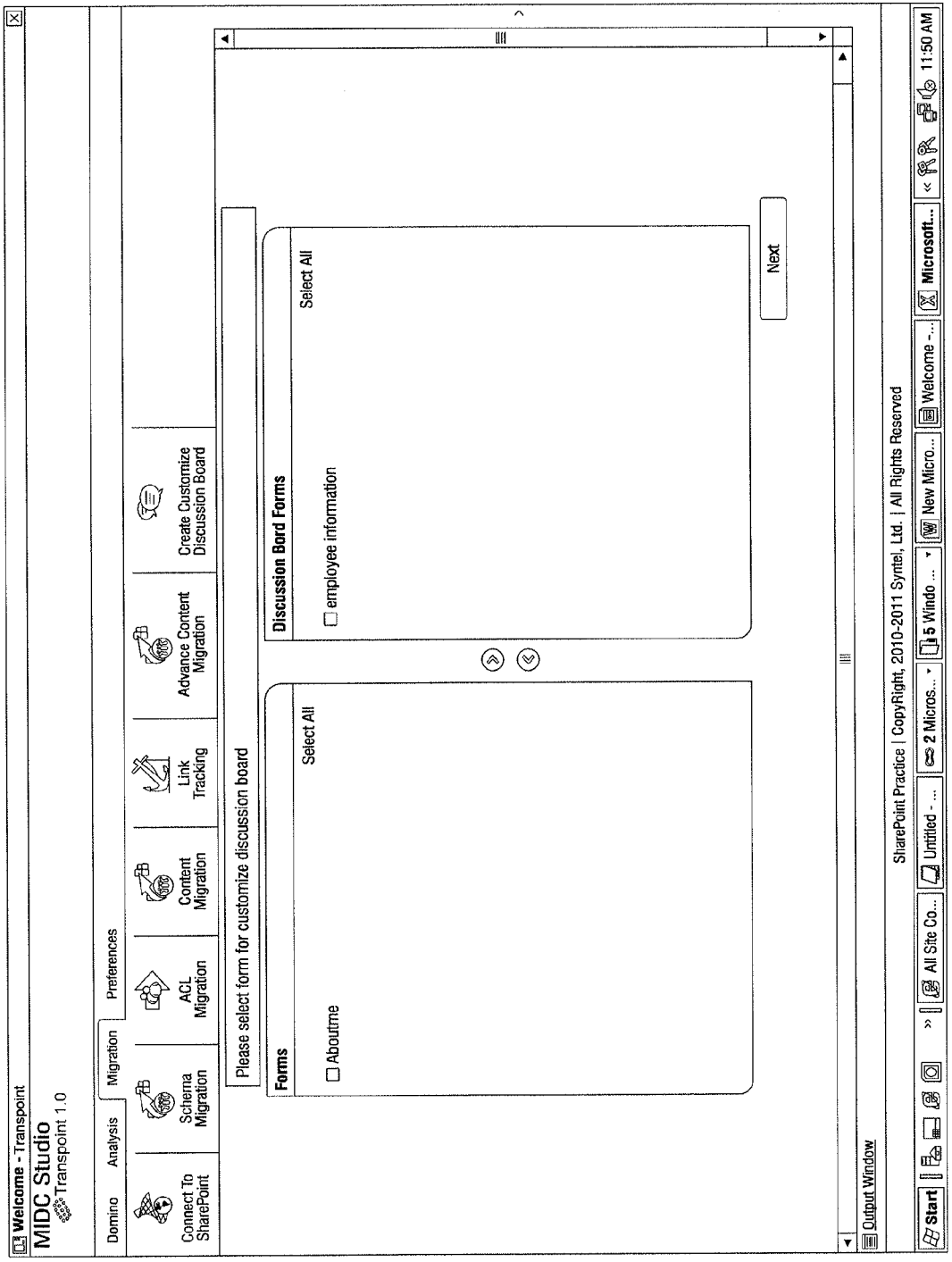
FIG. 20 shows an example user interface for migration of discussion boards according to one embodiment.

Depending on the circumstances, the system may be configured to customize the migration of discussion boards. For example, the Lotus Notes™ application may contain discussion boards, which can be ported to SharePoint™ using the system. FIG. 20 shows an example user interface for migration of discussion boards. In the example shown, the user is presented with a list of discussion groups and forms. The user may select which of these to migrate to the new platform.

Figure 21:
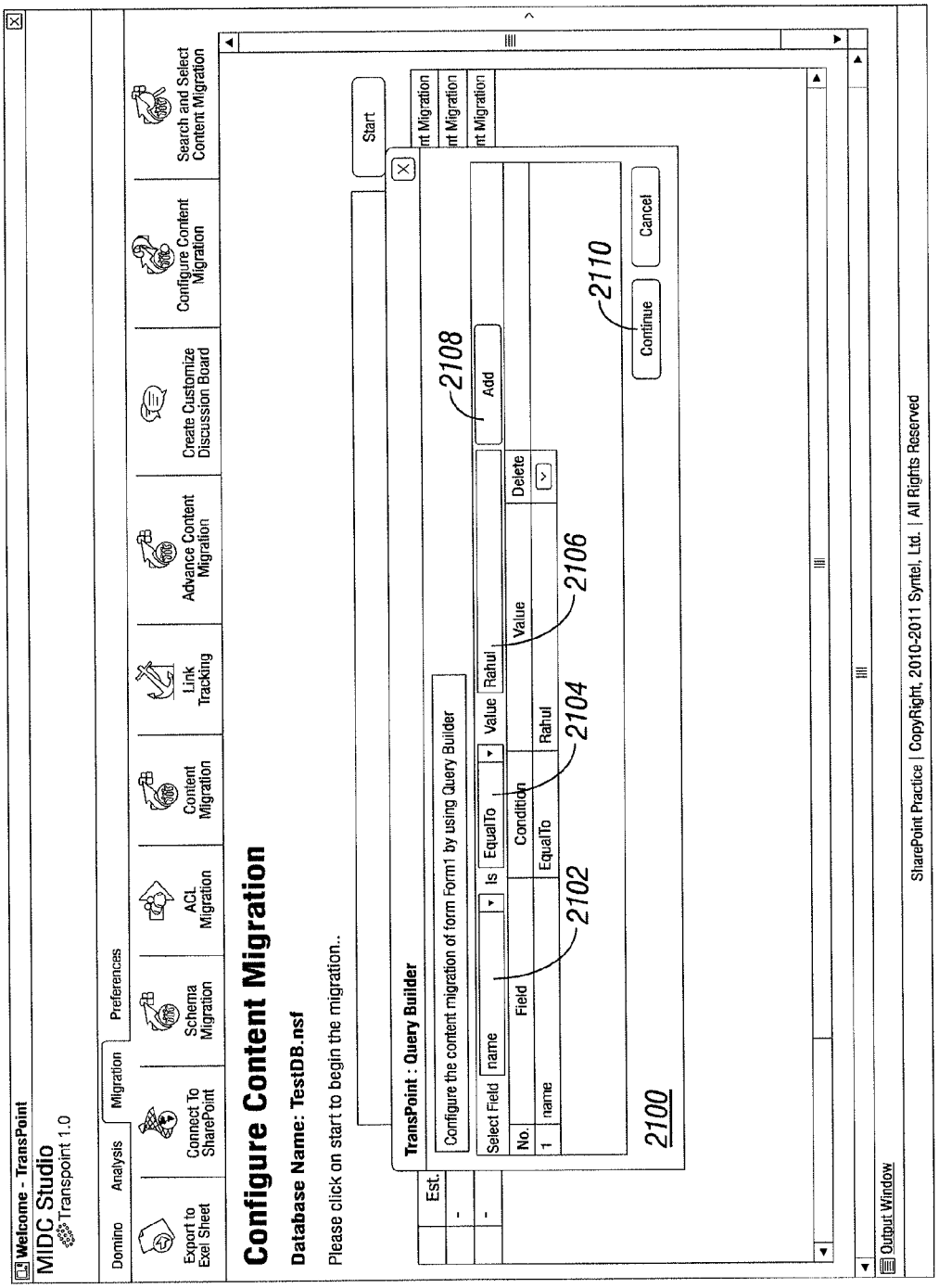
Figure 22:
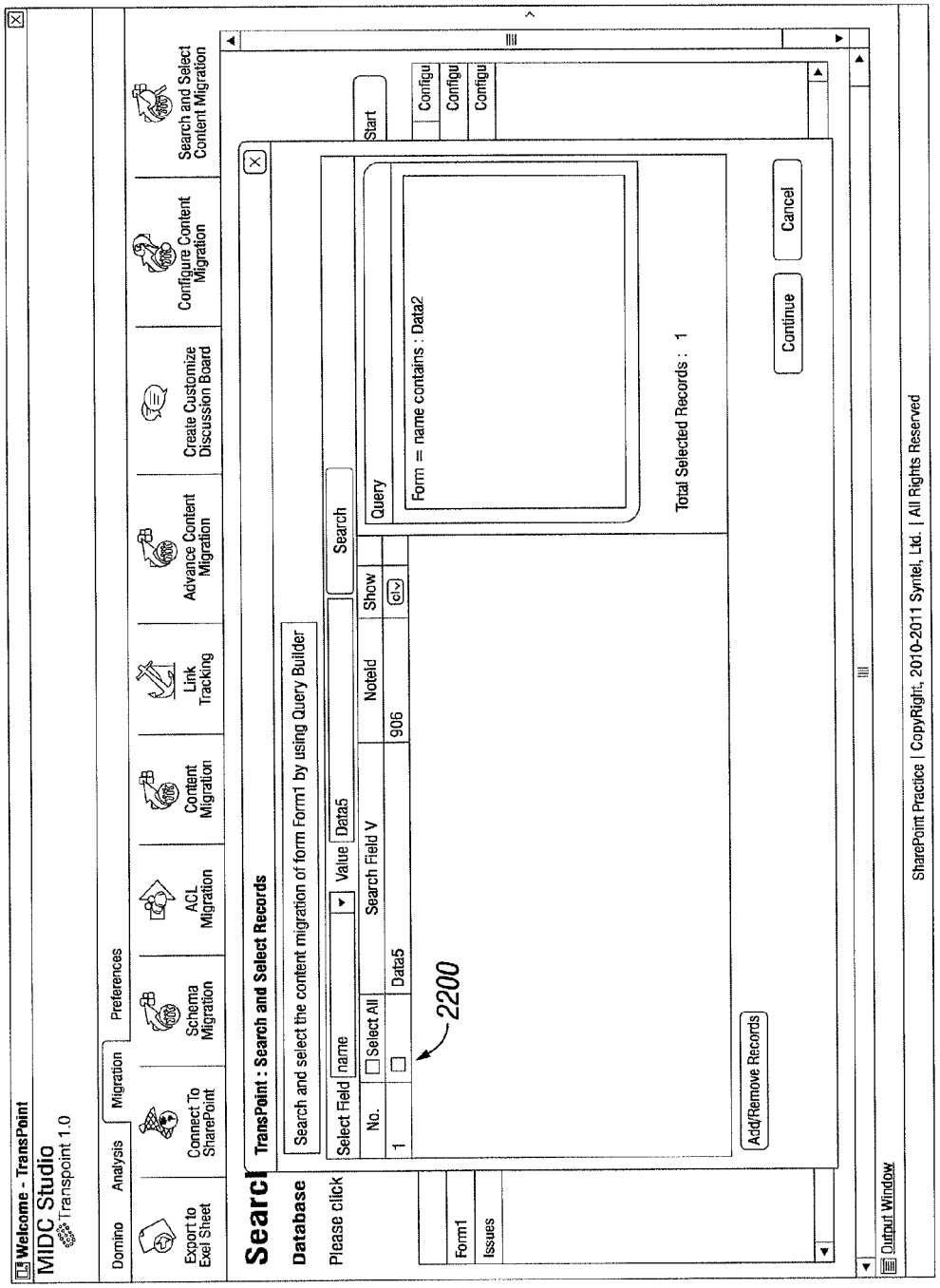

FIGS. 21-23 are screen shots showing an embodiment in which records can be selectively migrated. For example, the following actions could be taken:
  Query based migration: Apply query on lotus notes forms and then migrate the documents satisfying query condition.
  Search and Select: Search for documents, select the required ones and then migrate.
In some cases, such as the example shown in FIG. 21, a user may configure the content migration. In this example, a query builder window is active 2100 from which a query can be built. This allows a query to be configured for migrating specific query based forms and then migrate the forms satisfying query condition. As shown, the query may be built by selecting a field name 2102, a logic field 2104 that may be applied to a value field 2106 that the user entered into the system. One or more of these expressions may be added in this example by selecting the "Add" button 2108. When the user has built the query, the "Continue" button 2110 may be selected, which leads to a screen such as the example shown in FIG. 22. From the window shown in FIG. 22, the user may search for documents and select, such as using the check box 2200, the required ones to migrate.

In some embodiments, such as shown in FIG. 23, attachments to folders can be migrated inside a document library. Although Lotus Notes document attachments are typically migrated as list attachments in SharePoint, this embodiment allows attachments of the documents to be stored in a nested folder structure inside a document library in SharePoint. The nested folder structure is created using form fields which can be chosen by the user and then the attachments for the documents are migrated to a leaf folder. In the example shown in FIG. 23, the level 2300 may be selected to create a nested folder structure.

Figure 24:
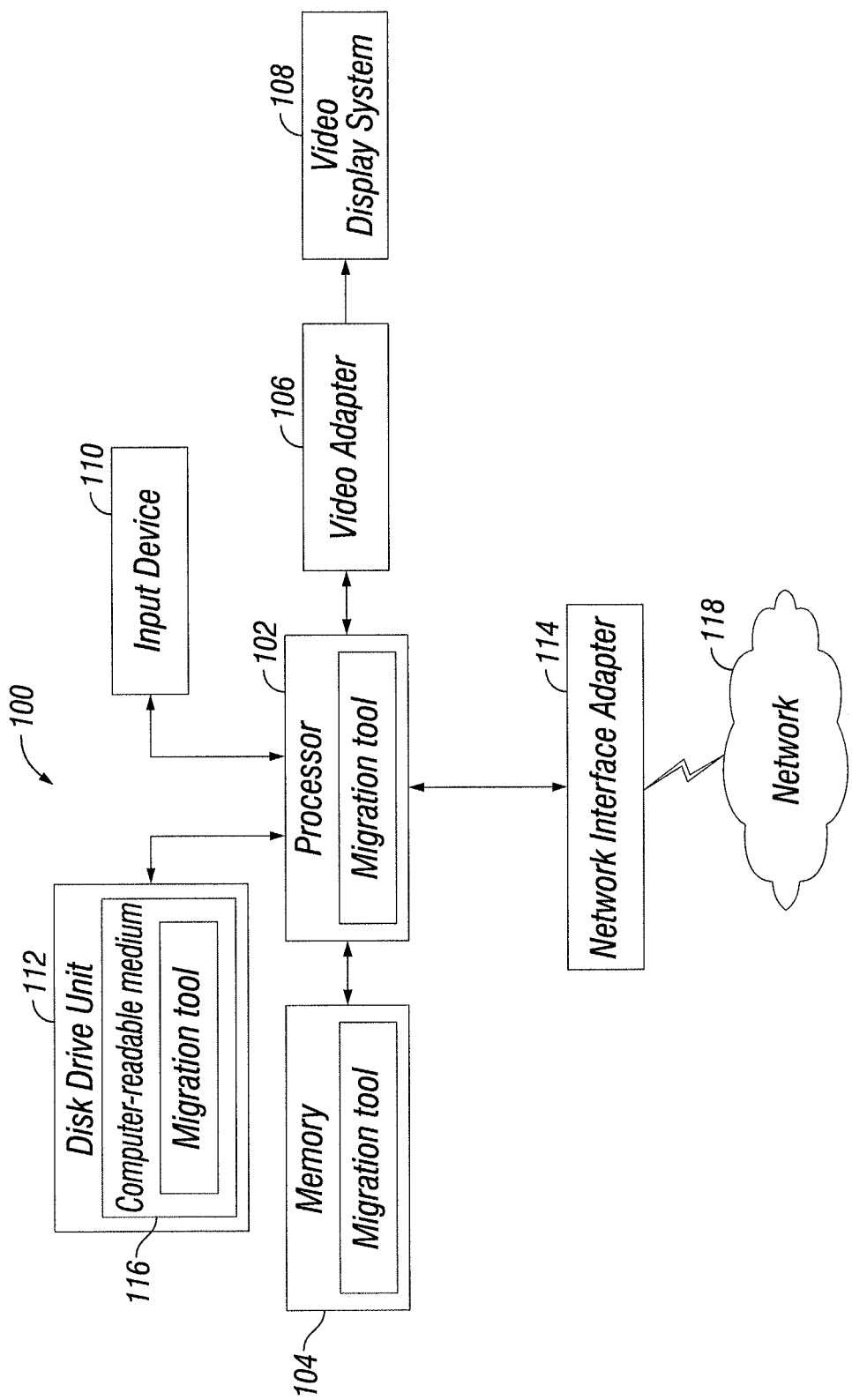
FIG. 24 illustrates a diagrammatic representation of a machine in the example form of a computer system that may be programmed with a set of instructions to perform any one or more of the methods discussed herein.

FIG. 24 illustrates a diagrammatic representation of a machine 100 in the example form of a computer system that may be programmed with a set of instructions to perform any one or more of the methods discussed herein. The machine 100 may be any machine or computer capable of executing a set of instructions that specify actions to be taken by that machine.

The machine 100 may operate as a standalone device or may be connected (e.g., networked) to other machines. In embodiments where the machine is a standalone device, the set of instructions could be a computer program stored locally on the device that, when executed, causes the device to perform one or more of the methods discussed herein. In embodiments where the computer program is locally stored, data may be retrieved from local storage or from a remote location via a network. In a networked deployment, the machine 100 may operate in the capacity of a server or a client machine in a server-client network environment, or as a peer machine in a peer-to-peer (or distributed) network environment. Although only a single machine is illustrated in FIG. 24, the term "machine" shall also be taken to include any collection of machines that individually or jointly execute a set (or multiple sets) of instructions to perform any one or more of the methods discussed herein.

The example machine 100 illustrated in FIG. 24 includes a processor 102 (e.g., a central processing unit ("CPU")), a memory 104, a video adapter 106 that drives a video display system 108 (e.g., a liquid crystal display ("LCD") or a cathode ray tube ("CRT")), an input device 110 (e.g., a keyboard, mouse, touch screen display, etc.) for the user to interact with the program, a disk drive unit 112, and a network interface adapter 114. Note that various embodiments of the machine 100 will not always include all of these peripheral devices.

The disk drive unit 112 includes a computer-readable medium 116 on which is stored one or more sets of computer instructions and data structures embodying or utilized by one or more of the methods described herein. The computer instructions and data structures may also reside, completely or at least partially, within the memory 104 and/or within the processor 102 during execution thereof by the machine 100; accordingly, the memory 104 and the processor 102 also constitute computer-readable media. Embodiments are contemplated in which the instructions associated with the migration tool may be transmitted or received over a network 118 via the network interface device 114 utilizing any one of a number of transfer protocols including but not limited to the hypertext transfer protocol ("HTTP") and file transfer protocol ("FTP"). The network 118 may be any type of communication scheme including but not limited to fiber optic, wired, and/or wireless communication capability in any of a plurality of protocols, such as TCP/IP, Ethernet, WAP, IEEE 802.11, or any other protocol.

While the computer-readable medium 116 is shown in the example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing a set of instructions for execution by the machine and that cause the machine to perform any one or more of the methods described herein, or that is capable of storing data structures utilized by or associated with such a set of instructions. The term "computer-readable medium" shall accordingly be taken to include, but not be limited to, solid-state memories, optical media, flash memory, and magnetic media.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A computerized system comprising: one or more computing devices including: a memory having program code stored therein; a processor in communication with the memory for carrying out instructions in accordance with the stored program code, wherein the program code, when executed by the processor, causes the processor to perform operations comprising: analyzing a legacy application to be migrated to a new platform; generating one or more reports showing results of the analysis of the legacy application; migrating a schema of the legacy application to the new platform according to one of a plurality of schema modes; and migrating a content of the legacy application to the new platform wherein the plurality of schema modes includes a first schema mode in which the schema of the legacy application is migrated as-is and a second schema mode in which the schema of the legacy application is customized by a user prior to content migration; wherein the one or more reports includes respective counts of forms, sub-forms, framesets, views, pages, and agents of the legacy application content that fall within each of a plurality of predetermined complexity categories.

2. The computerized system of claim 1, wherein the operation of analyzing comprises determining a complexity of migrating the legacy application to the new platform.

3. The computerized system of claim 1, wherein the operation of migrating a content comprises directly migrating at least a portion of content independent of the migrating a schema.

4. The computerized system of claim 1, wherein a first document of the content of the legacy application includes a link to a second document of the content of the legacy application; and the operation of migrating the content comprises preserving the link.

5. The computerized system of claim 1, wherein the customized schema of the second schema mode is customized by the user via field level selection and field name editing.

6. The computerized system of claim 4, wherein the operation of customizing comprises presenting a graphical user interface to the user for selecting an individual field of the schema portion for migration.

7. The computerized system of claim 1, wherein the operations further comprise: querying the content of the legacy application; and migrating a portion of the content satisfying a condition of the querying.

8. The computerized system of claim 1, wherein the new platform comprises a cloud platform.

9. The computerized system of claim 1, wherein the one or more reports displays separate estimates of time and cost associated with migrating the legacy application to the new platform.

10. A computerized system comprising: one or more computing devices including: a memory having program code stored therein; a processor in communication with the memory for carrying out instructions in accordance with the stored program code, wherein the program code, when executed by the processor, causes the processor to perform operations comprising: analyzing a legacy application to determine a complexity of migrating the legacy application to a new platform; generating one or more reports showing the complexity of migrating the legacy application to the new platform; migrating a schema of the legacy application to the new platform; and migrating a content of the legacy application to the new platform wherein a first document of the content of the legacy application includes a link to a second document of the legacy application content; and migrating the legacy application content to the new platform comprises preserving the link; wherein the one or more reports includes respective counts of forms, sub-forms, framesets, views, pages, and agents of the legacy application content that fall within each of a plurality of predetermined complexity categories.

11. The computerized system of claim 10, wherein the operation of analyzing comprises determining a complexity of migrating the legacy application to the new platform.

12. The computerized system of claim 10, wherein the operation of migrating a content comprises directly migrating at least a portion of content independent of the migrating a schema.

13. The computerized system of claim 10, wherein the first document is in a first database of the legacy application content and the second document is in a second database of the legacy application content.

14. The computerized system of claim 10, wherein the schema of the legacy application is migrated according to one of a plurality of schema modes; the plurality of schema modes includes a first schema mode in which the schema of the legacy application is migrated as-is; and, the plurality of schema modes includes a second schema mode in which the schema of the legacy application is customized by the user prior to content migration.

15. The computerized system of claim 14, wherein the operation of customizing comprises selecting an individual field of the schema portion for migration.

16. The computerized system of claim 10, wherein the operations further comprise: querying the content of the legacy application; and migrating a portion of the content satisfying a condition of the querying.

17. The computerized system of claim 10, wherein migrating the content of the legacy application to the new platform comprises storing attachments of legacy documents in a nested folder structure inside a document library.

18. The computerized system of claim 10, wherein the one or more reports displays separate graphical estimates of time and cost associated with migrating the legacy application to the new platform.

19. The computerized system of claim 10, wherein the content includes an access control list.

20. A computer system comprising: one or more processing devices; and one or more storage devices storing instructions, which, when executed, cause the one or more processing devices to implement: a graphical user interface configured with one or more interface elements from which a user can select one or more of an application schema and application content from a legacy application to be migrated to a new platform; a pre-migration analysis unit configured to analyze complexity of migrating the legacy application by counting one or more types of design elements in the legacy application, wherein the pre-migration analysis unit is configured to generate a report based on the analysis of legacy application; and a migration unit configured to migrate the legacy application to the new platform based on one or more selections on the user interface wherein the graphical user interface is configured to provide a query builder to the user for the user to build a query; and the migration unit is configured to migrate content of the legacy application that satisfies the query; wherein the one or more reports includes respective counts of forms, sub-forms, framesets, views, pages, and agents of the legacy application content that fall within each of a plurality of predetermined complexity categories.

21. The computer system of claim 20, wherein the user interface is configured to customize application schema migration using one or more graphical user interface elements from which the user can perform field level selection of the application schema.

22. The computer system of claim 21, wherein migration unit is configured to migrate the schema of the legacy application according to one of a plurality of schema modes; the plurality of schema modes includes a first schema mode in which the schema of the legacy application is migrated as-is; the plurality of schema modes includes a second schema mode in which migration is customized by the user prior to content migration; and the interface is configured with one or more interface elements from which a user can customize application schema migration by editing field names of the application schema.

23. The computer system of claim 20, wherein the pre-migration analysis unit is configured to classify complexity of the design elements into a plurality of predetermined complexity levels.

24. The computer system of claim 20, wherein the interface is configured with one or more interface elements from which the user can customize discussion board migration.

25. The computer system of claim 20, wherein the query builder is configured to allow the user to select a field name, a value, and a logical operator to apply to the value.

26. The computer system of claim 20, wherein the pre-migration analysis unit is configured to export the report to a spreadsheet application for data analysis.

27. The computer system of claim 20, wherein the migration unit is configured to directly migrate at least a portion of content independent of application schema migration.

28. The computer system of claim 20, wherein the pre-migration analysis unit is configured to provide recommendations for application content to be migrated.

29. The computer system of claim 20, wherein the instructions, which, when executed, cause the one or more processing devices to implement a post-migration unit configured to archive a portion of the application content from the legacy application.

* * * * *